(12) United States Patent
Murakami et al.

(10) Patent No.: US 8,340,361 B2
(45) Date of Patent: Dec. 25, 2012

(54) BIOMETRIC AUTHENTICATION SYSTEM, AUTHENTICATION CLIENT TERMINAL, AND BIOMETRIC AUTHENTICATION METHOD

(75) Inventors: Takao Murakami, Yokohama (JP); Kenta Takahashi, Kamakura (JP)

(73) Assignee: Hitachi, Ltd., Tokyo (JP)

( * ) Notice: Subject to any disclaimer, the term of this patent is extended or adjusted under 35 U.S.C. 154(b) by 966 days.

(21) Appl. No.: 12/379,715

(22) Filed: Feb. 27, 2009

(65) Prior Publication Data

US 2009/0289760 A1 Nov. 26, 2009

(30) Foreign Application Priority Data

Apr. 30, 2008 (JP) ................................. 2008-119131
Dec. 8, 2008 (JP) ................................. 2008-312411

(51) Int. Cl.
*G06K 9/00* (2006.01)
*G05B 19/00* (2006.01)
*G05B 13/02* (2006.01)
*G06F 7/00* (2006.01)

(52) U.S. Cl. ........ 382/115; 340/5.52; 340/5.82; 700/47; 707/725; 707/748; 707/754

(58) Field of Classification Search .................. None
See application file for complete search history.

(56) References Cited

U.S. PATENT DOCUMENTS

| | | | | |
|---|---|---|---|---|
| 5,850,470 A * | 12/1998 | Kung et al. | ................... | 382/157 |
| 6,624,739 B1 * | 9/2003 | Stobbe | ........................... | 340/5.2 |
| 6,829,384 B2 * | 12/2004 | Schneiderman et al. | ..... | 382/154 |
| 6,844,506 B2 * | 1/2005 | Nuesch et al. | ............. | 177/25.11 |
| 6,940,545 B1 * | 9/2005 | Ray et al. | ................... | 348/222.1 |
| 7,161,468 B2 * | 1/2007 | Hwang et al. | ................. | 340/5.82 |
| 7,167,574 B2 * | 1/2007 | Kim | ............................... | 382/100 |
| 7,212,233 B2 * | 5/2007 | Nakamura | ................. | 348/221.1 |
| 7,242,810 B2 * | 7/2007 | Chang | ........................... | 382/227 |
| 7,277,891 B2 | 10/2007 | Howard et al. | | |
| 7,362,884 B2 * | 4/2008 | Willis et al. | ................... | 382/116 |
| 7,508,961 B2 * | 3/2009 | Chen et al. | .................... | 382/118 |
| 7,565,548 B2 * | 7/2009 | Fiske et al. | .................... | 713/186 |
| 7,583,822 B2 * | 9/2009 | Guillemot et al. | ............ | 382/115 |
| 7,596,246 B2 * | 9/2009 | Miller et al. | ................... | 382/115 |
| 7,606,396 B2 * | 10/2009 | Miller et al. | .................. | 382/116 |
| 7,742,641 B2 * | 6/2010 | Ivanov et al. | ................. | 382/224 |

(Continued)

OTHER PUBLICATIONS

Bazen et al., Likelihood Ratio Based Biometric Verification, Jan. 2004, vol. 14, No. 1, pp. 86-94.*

(Continued)

*Primary Examiner* — George Bugg
*Assistant Examiner* — Renee Dorsey
(74) *Attorney, Agent, or Firm* — Antonelli, Terry, Stout & Kraus, LLP.

(57) ABSTRACT

A biometric authentication system, authentication client terminal, and biometric authentication method are provided to reduce an expected value of the number of inputs of biometric data for authentication, while effectively preventing forgery. In a biometric authentication system, prior probabilities of enrolled users $u_n$ and non-enrolled user $u_0$ are previously set. 1:N matching is performed between feature data of a claimant v and matching feature data. The matching score is calculated for each enrolled user $u_n$. A ratio of the likelihood $v=u_n$ to the likelihood $v \neq u_n$ is calculated for each enrolled user $u_n$ using the calculated matching scores. Posterior probabilities of the enrolled users $u_n$ and non-enrolled user $u_0$ are calculated, using the likelihood ratios, and the prior probabilities of both the enrolled users $u_n$ and the non-enrolled user $u_0$. Then, determination is made by comparing each posterior probability with a first threshold.

16 Claims, 8 Drawing Sheets

U.S. PATENT DOCUMENTS

| | | | |
|---|---|---|---|
| 7,783,082 B2 * | 8/2010 | Koshizen et al. | 382/118 |
| 7,873,583 B2 * | 1/2011 | Laxman et al. | 706/20 |
| 7,912,252 B2 * | 3/2011 | Ren et al. | 382/117 |
| 7,945,101 B2 * | 5/2011 | Chen et al. | 382/229 |
| 7,961,955 B1 * | 6/2011 | Minter | 382/224 |
| 7,974,475 B1 * | 7/2011 | Minter | 382/209 |
| 7,983,490 B1 * | 7/2011 | Minter | 382/224 |
| 8,014,570 B2 * | 9/2011 | Le Saint et al. | 382/115 |
| 2002/0028021 A1 * | 3/2002 | Foote et al. | 382/224 |
| 2002/0131641 A1 * | 9/2002 | Luo et al. | 382/218 |
| 2002/0159627 A1 * | 10/2002 | Schneiderman et al. | 382/154 |
| 2002/0172303 A1 * | 11/2002 | Matsumoto et al. | 375/340 |
| 2004/0054572 A1 * | 3/2004 | Oldale et al. | 705/10 |
| 2004/0179719 A1 * | 9/2004 | Chen et al. | 382/118 |
| 2005/0063567 A1 * | 3/2005 | Saitoh et al. | 382/115 |
| 2005/0066180 A1 * | 3/2005 | Watanabe | 713/186 |
| 2005/0163367 A1 * | 7/2005 | Zhang et al. | 382/154 |
| 2005/0190973 A1 * | 9/2005 | Kristensson et al. | 382/229 |
| 2005/0207626 A1 * | 9/2005 | Kang et al. | 382/124 |
| 2006/0093208 A1 * | 5/2006 | Li et al. | 382/159 |
| 2006/0167784 A1 * | 7/2006 | Hoffberg | 705/37 |
| 2006/0222210 A1 * | 10/2006 | Sundaram | 382/115 |
| 2006/0224898 A1 * | 10/2006 | Ahmed | 713/186 |
| 2006/0251339 A1 * | 11/2006 | Gokturk et al. | 382/305 |
| 2007/0071286 A1 * | 3/2007 | Lee et al. | 382/115 |
| 2007/0127825 A1 * | 6/2007 | Ivanov | 382/228 |
| 2007/0189611 A1 * | 8/2007 | Yang et al. | 382/228 |
| 2007/0219801 A1 * | 9/2007 | Sundaram et al. | 704/270 |
| 2007/0258626 A1 * | 11/2007 | Reiner | 382/115 |
| 2007/0286463 A1 * | 12/2007 | Ritzau et al. | 382/118 |
| 2008/0080775 A1 * | 4/2008 | Zabih et al. | 382/226 |
| 2008/0118124 A1 * | 5/2008 | Madabhushi et al. | 382/128 |
| 2008/0172725 A1 * | 7/2008 | Fujii et al. | 726/5 |
| 2008/0193048 A1 * | 8/2008 | Sun et al. | 382/284 |
| 2008/0195541 A1 * | 8/2008 | Battaglini et al. | 705/43 |
| 2008/0222706 A1 * | 9/2008 | Renaud et al. | 726/4 |
| 2008/0260212 A1 * | 10/2008 | Moskal et al. | 382/118 |
| 2009/0023398 A1 * | 1/2009 | Boyle | 455/90.2 |
| 2009/0025081 A1 * | 1/2009 | Quigley et al. | 726/21 |
| 2009/0141947 A1 * | 6/2009 | Kyyko et al. | 382/118 |
| 2010/0284575 A1 * | 11/2010 | Yoshimine et al. | 382/116 |

OTHER PUBLICATIONS

R. McDonough, A. Whalen, Detection of Signals in Noise, 1995, AT&T Bell Laboratories and Academic Press, Inc., 2nd Edition, pp. 155-173.*

* cited by examiner

FIG.5
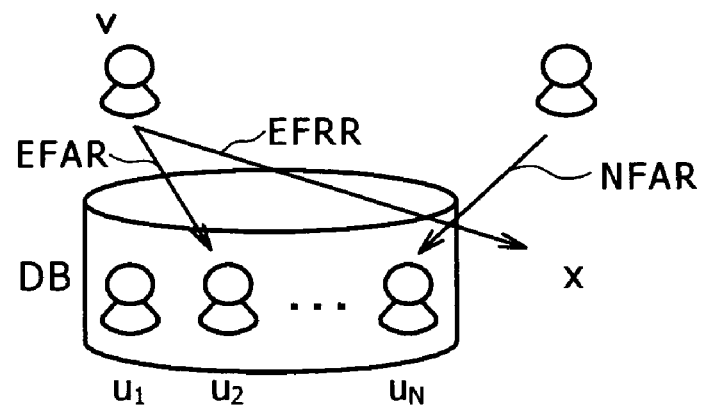
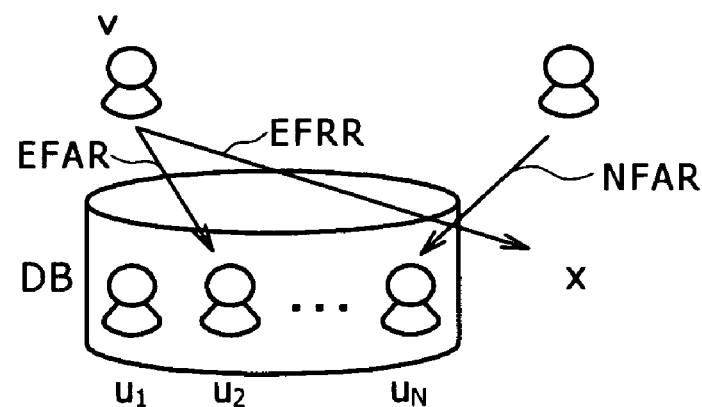

BIOMETRIC AUTHENTICATION SYSTEM, AUTHENTICATION CLIENT TERMINAL, AND BIOMETRIC AUTHENTICATION METHOD

INCORPORATION BY REFERENCE

This application claims priority based on Japanese patent applications, No. 2008-119131 filed on Apr. 30, 2008 and No. 2008-312411 filed on Dec. 8, 2008, the entire contents of which are incorporated herein by reference.

BACKGROUND

The present invention relates to a biometric authentication system using biometric information to verify identities.

Biometric authentication is known as an authentication technology with advantages that the forgery of information input for authentication (for example, fingerprint) is more difficult than the authentication based on the password, IC card, or other identifying information, and that the information input for authentication is not forgotten.

In the biometric authentication, biometric data is first acquired from a user, and information called the feature is extracted from the biometric data and is registered in advance. This registered information is called the enrolled template. The user who has been registered in advance is called the enrolled user. Upon authentication of a user, the biometric data is acquired from the user, and the feature extracted from the biometric data is checked against the enrolled template to perform authentication (identity verification). The user to be identified is called the claimant.

One of biometric authentication technologies that identifies a claimant to find out the identical enrolled user by matching the claimant with each of N enrolled users (hereinafter referred to as "1:N matching"), is called biometric identification. In conventional biometric identification, when an enrolled user identified as the claimant (hereinafter referred to as "identified user") exists, authentication success is determined with the identified user as the determination result. While authentication failure is determined when no identified user exists. Examples of the biometric authentication system using biometric identification are a time and attendance management system, and a system for credit payment only using biometric authentication instead of using a credit card (hereinafter referred to as "cardless credit payment system"). Biometric identification does not require the claimant to present a card or other means of identification, and has an advantage of high availability.

FIG. 5 shows types of authentication error rate in biometric identification. The authentication error rate in biometric identification can be classified into the following three types.
(1) Error rate that occurs when a claimant previously registered is successfully authenticated as another enrolled user (hereinafter referred to as "Enrollee False Acceptance Rate: EFAR).
(2) Error rate that occurs when a claimant previously registered fails to be authenticated (hereinafter referred to as "Enrollee False Rejection Rate: EFRR").
(3) Error rate that occurs when a user not previously registered (hereinafter referred to as "non-enrolled user") is successfully authenticated (hereinafter referred to as "Non-Enrollee False Acceptance Rate: NFAR").

When EFAR or NFAR is high the possibility that the claimant will be successfully authenticated as another person increases, resulting in a decrease in security. Such an authentication error of when the claimant is successfully authenticated as another person, is called erroneous identification. When EFRR is high the possibility that the registered claimant will fail to be authenticated increases, resulting in a decrease in availability.

There are authentication methods proposed to increase the authentication accuracy in biometric identification. This authentication method asks the claimant to input plural biometric information (for example, biometric information of different types such as fingerprint, iris, voice, or biometric information of the same type collected from different areas of the body such as index fingerprint, middle fingerprint, and fourth fingerprint), and integrates the input biometric data to determine the identity of the claimant (hereinafter referred to as "1:N combined authentication"). For example, in U.S. Pat. No. 7,277,891 B2, the claimant candidates (enrolled users who may possibly be identical to a claimant) are narrowed down by first biometric data (for example, face), and the remaining candidates are further narrowed down by second biometric data (for example, fingerprint). Finally the last remaining candidates are output as the determination result.

However, in 1:N combined authentication, the claimant needs to input plural types of biometric information, so that the authentication procedure is complicated, and availability decreases. In addition, the time from the input of the first biometric data to the output of the authentication result (hereinafter referred to as "authentication time") is longer than the case of authentication using only one piece of biometric data, resulting in a further decrease in availability. However, no measure has been taken to solve such problems in U.S. Pat. No. 7,277,891 B2.

In U.S. Pat. No. 7,277,891 B2, the system may output plural candidates. For example, in an application such as cardless credit payment, it is necessary to narrow down possible claimants to only one user. Thus, one identified user is manually selected after plural candidates are output, resulting in a further decrease in availability.

An approach to solve the problem is proposed in Hideki Noda, "Sequential Probability Ratio Test for Adaptive Speaker Identification", IEICE technical report D-II Vol. J84-D-II, No. 1, pp. 211-213 (2001). This approach uses the distribution $p_n(x_j)$ of the features of enrolled users $u_n$ (n=1 to N) and the distribution $p_0(x_j)$ of the feature of all enrolled users, to calculate the likelihood ratio $l_n$ for each of the enrolled users, each time the voice feature $x_J$ (J=1, 2, and so on) is acquired, by the following equation.

$$l_n = \prod_{j=1}^{J} P_n(x_j)/P_0(x_j) \tag{1}$$

When the obtained likelihood ratio $l_n$ is larger than a threshold A, authentication success is determined with the enrolled user $u_n$ at this time as the identified user. When the obtained likelihood ratio $l_n$ is smaller than a threshold B, one or more enrolled users $u_n$ corresponding to the likelihood ratio $l_n$ are excluded from the matching target in the subsequent steps, which is hereinafter referred to as "pruning". When no identified user is obtained, another feature $x_J$ is acquired to repeat determination until the identified user is obtained. As described above, the determination of the claimant is performed by comparing the likelihood ratio with the threshold A each time the feature is acquired, in order to reduce the number of inputs of the biometric data necessary for authentication. Further, the time for 1:N matching is substantially proportional to the number of enrolled users N to be matched.

Thus, the time for 1:N matching is reduced by pruning the enrolled user(s) based on the result of comparing each of the likelihood ratios with the threshold B. In this way, the authentication time is further reduced.

SUMMARY OF THE INVENTION

In the technology disclosed in the Noda, the determination is made by comparing the likelihood ratios with the threshold each time the feature is acquired, in order to aim at reducing the number of inputs of the biometric data necessary for authentication. However, the method of biometric identification that calculates likelihood ratios from the feature distribution and compares the obtained likelihood ratios with the threshold, provides no logical guarantee for minimizing the expected value of the number of inputs of the biometric data necessary for determination. In other words, the technology of the Noda has left room for improvement in reduction of the expected value of the number of inputs of the biometric data necessary for authentication.

Further, in conventional biometric identification systems, there is a problem that a malicious user, who has not been registered, attempts authentication over and over again to be successful in forgery.

The present invention addresses the above identified problems by providing a biometric authentication system, an authentication client terminal, and a biometric authentication method that can significantly reduce the expected value of the number of inputs of the biometric data necessary for authentication, and effectively prevent forgery.

In order to solve the above problems, a biometric authentication system according to the present invention includes: a database holding enrolled feature data with respect to each of enrolled users $u_n$ (n=1 to N); a feature extraction unit for extracting feature data of a claimant v based on biometric data acquired from the claimant v; a prior probability setting unit for setting prior probabilities of the enrolled users $u_n$ and a prior probability of a non-enrolled user $u_0$; a likelihood ratio calculation unit for calculating a ratio of the likelihood $v=u_n$ to the likelihood $v \neq u_n$ with respect to each of the enrolled users $u_n$, based on the matching feature data held in the database and the extracted feature data of the claimant; a posterior probability calculation unit for calculating posterior probabilities of the enrolled users $u_n$ and a posterior probability of the non-enrolled user $u_0$, using the calculated likelihood ratios, the prior probabilities of the enrolled users $u_n$, and the prior probability of the non-enrolled user $u_0$; and a determination unit for comparing each of the calculated posterior probabilities with a first threshold, when a maximum value of the posterior probability is larger than the first threshold, and when the posterior probability showing the maximum value is one of the posterior probabilities of the enrolled users $u_n$, the determination unit determining that the corresponding enrolled user and the claimant v are identical, while when the posterior probability showing the maximum value is the posterior probability of the non-enrolled user $u_0$, the determination unit determining that the claimant v is a user other than the enrolled users $u_n$.

Another embodiment of the present invention further includes a 1: N matching unit for performing 1:N matching between the extracted claimant feature data and the feature data held in the database, and calculating a matching score of each of the enrolled users $u_n$. The likelihood ratio calculation unit calculates the likelihood ratio of each of the enrolled users $u_n$ by using the calculated matching scores.

In still another embodiment of the present invention, when the maximum value of the posterior probability is equal to or less than the first threshold, and when the number of acquisitions of the biometric data from the claimant v is less than a predetermined value, the determination unit requests to reacquire the biometric data of the claimant v, while when the number of acquisitions of the biometric data is equal to or more than the predetermined value, the determination unit determines "authentication failure". In this case, it is possible to further include an enrolled user pruning unit. When the determination unit requests to reacquire the biometric data, the enrolled user pruning unit compares each of the posterior probabilities calculated by the posterior probability calculation unit with a second threshold, and excludes a enrolled user $u_n$ corresponding to the posterior probability smaller than the second threshold, from the target to be matched to the claimant v.

In still another embodiment of the present invention, the posterior probability calculation unit compares the posterior probability of the non-enrolled user $u_0$ calculated in the current acquisition of the biometric data with the prior probability of the non-enrolled user $u_0$ when the number of acquisitions of the biometric data is one, or with the prior probability of the non-enrolled user $u_0$ calculated in the previous acquisition of the biometric data when the number of acquisitions is two or more. When the posterior probability of the non-enrolled user $u_0$ calculated in the current acquisition of the biometric data is higher, the posterior probability calculation unit does not use the feature data extracted in the current acquisition in the posterior probability calculation in the subsequent acquisitions of the biometric data.

In still another embodiment of the present invention, the database holds plural different types of matching feature data belonging to plural modalities with respect to each of the enrolled users $u_n$. The embodiment further includes a biometric information input sensor that allows for acquisition of the biometric data only once.

In still another embodiment of the present invention, the database holds plural different types of matching feature data belonging to the same modality with respect to each of the enrolled users $u_n$. The 1:N matching unit determines "authentication failure" when the best matching score is obtained for the same biometric information several times until input of the biometric data in this time.

In still another embodiment of the present invention, the database holds plural different types of matching feature data belonging to the same modality with respect to each of the enrolled users $u_n$. When the best matching score is obtained in several times for the same biometric information until input of the biometric data in this time, the 1:N matching unit ensures not to use the matching scores obtained in inputs other than the input with the best matching score achieved in the calculation of likelihood ratios by the likelihood ratio calculation unit.

In still another embodiment of the present invention, the prior probability setting unit increases the prior probability of the non-enrolled user $u_0$ when the determination unit determines that the claimant v is a user other than the enrolled users $u_n$.

In still another embodiment of the present invention, the first threshold is larger than 0.5.

In any of the above described embodiments, when it is determined that the claimant v is a user other than the enrolled users $u_n$, the determination unit can output forgery warning information.

Still another embodiment of the present invention further includes a loss calculation unit, as well as a prior probability and threshold setting unit. Each time authentication is performed, the loss calculation unit calculates a loss $W_1$ when the claimant v is an enrolled user and is identified as another enrolled user, and a loss $W_0$ when the claimant v is a non-enrolled user and is identified as a certain enrolled user. The prior probability and threshold setting unit sets the prior probabilities of the enrolled users $u_n$ and a corresponding threshold, as well as the prior probability of the non-enrolled user $u_0$ and a corresponding threshold, respectively, using the losses $W_1$ and $W_0$. With this setting, EFRR as well as an expected value R, of the loss in the determination of the n-th enrolled user are equal to or less than respective desired values.

Another biometric authentication system according the present invention, includes: a database holding enrolled feature data with respect to each of enrolled users $u_n$ (n=1 to N); a feature extraction unit for extracting feature data of a claimant v based on biometric data acquired from the claimant v; a 1:N matching unit for performing 1:N matching between the extracted claimant feature data and the matching feature data held in the database, and calculating a matching score of each of the enrolled users $u_n$; a likelihood ratio calculation unit for calculating the ratio of the likelihood $v=u_n$ to the likelihood $v \ne u_n$ with respect to each of the enrolled users $u_n$ by using the calculated matching scores; and a determination unit for comparing each of the calculated likelihood ratios with a first threshold, when a maximum value of the likelihood ratio is larger than the first threshold, the determination unit determining that the enrolled user corresponding to the likelihood ratio showing the maximum value is identical to the claimant v, while when the maximum value of the likelihood ratio is equal to or less than the first threshold, and when the number of acquisitions of the biometric data from the claimant v is less than a predetermined value, the determination unit requesting to reacquire the biometric data of the claimant v, and when the number of acquisitions is equal to or more than the predetermined value, the determination unit determining "authentication failure".

Further, it is possible to further include an enrolled user pruning unit. When the determination unit requests to reacquire the biometric data, the enrolled user pruning unit compares each of the likelihood ratios calculated by the likelihood calculation unit with a second threshold, and excludes a enrolled user $u_n$ corresponding to the likelihood ratio smaller than the second threshold, from the target to be matched to the claimant v.

In order to solve the above described problem, an authentication client terminal according to the present invention is configured to be able to communicate with an authentication server terminal. The authentication server terminal includes a database holding enrolled feature data with respect to each of enrolled users $u_n$ (n=1 to N), and a prior probability setting unit for setting prior probabilities of the enrolled users $u_n$ and a prior probability of a non-enrolled user $u_0$. The authentication client terminal includes: a feature extraction unit for extracting the feature data of a claimant v based on the biometric data acquired from the claimant v; an authentication request unit for transmitting the extracted claimant feature data to the authentication server terminal, calculating a ratio of likelihood $v=u_n$ to likelihood $v \ne u_n$ with respect to each of the enrolled users $u_n$, based on the claimant feature data and the matching feature data held in the database, calculating the posterior probabilities of the enrolled users $u_n$ and the posterior probability of the non-enrolled user $u_0$, using the calculated likelihood ratios, the set prior probabilities of the enrolled users $u_n$, and the set prior probability of the non-enrolled user $u_0$, comparing each of the calculated posterior probabilities with a first threshold, when a maximum value of the posterior probability is larger than the first threshold, the authentication request unit requesting to transmit the information of the enrolled user $u_n$ or non-enrolled user $u_0$ corresponding to the posterior probability showing the maximum value, and acquiring the information transmitted from the authentication server terminal in response to the request; and a determination unit for determining that when the acquired information is of the corresponding enrolled user $u_n$, the enrolled user $u_n$ and the claimant v are identical, and that when the acquired information is of the non-enrolled user $u_0$, the claimant v is a user other than the enrolled users $u_n$.

In the embodiments of the present invention, the authentication request unit performs 1:N matching between the extracted claimant feature data and the matching feature data held in the database, calculates the matching score of each of the enrolled users $u_n$, and calculates the likelihood ratio of each of the enrolled users $u_n$ by using the calculated matching scores.

In order to solve the above described problem, a biometric authentication method according to the present invention, includes: a step of extracting feature data of a claimant v based on the biometric data acquired from the claimant v; a prior probability setting unit for setting prior probabilities of the enrolled users $u_n$ and a prior probability of a non-enrolled user $u_0$; a step of calculating a ratio of likelihood $v=u_n$ to likelihood $v \ne u_n$ with respect to each of the enrolled users $u_n$, based on the matching feature data held in the database with respect to each of the enrolled users $u_n$ (n=1 to N), as well as on the extracted claimant feature data; a step of calculating posterior probabilities of the enrolled users $u_n$ and a posterior probability of the non-enrolled user $u_0$, using the calculated likelihood ratios, the set prior probabilities of the enrolled users $u_n$, and the set prior probability of the non-enrolled user $u_0$; and a step of comparing each of the calculated posterior probabilities with a first threshold, when a maximum value of the posterior probability is larger than the first threshold, and when the posterior probability showing the maximum value is one of the posterior probabilities of the enrolled users $u_n$, determining that the corresponding enrolled user and the claimant v are identical, while when the posterior probability showing the maximum value is the posterior probability of the non-enrolled user $u_0$, determining that the claimant v is a user other than the enrolled users $u_n$.

The embodiments of the present invention, further includes a step of performing 1:N matching between the extracted claimant feature data and the matching feature data held in the database, and calculating a matching score of each of the enrolled users $u_n$. The likelihood ratio calculating step involves calculating the likelihood ratio of each of the enrolled users $u_n$ by using the calculated matching scores.

According to the present invention, the determination is made by calculating the ratio of the likelihood $v=u_n$ to the likelihood $v \ne u_n$ with respect to each of the enrolled users $u_n$, normalizing the likelihood ratios to the posterior probabilities of the enrolled users $u_n$ and to the posterior probability of the non-enrolled user $u_0$, and comparing each of the posterior probabilities with a threshold. This method significantly reduces (logically minimizes) the expected value of the number of inputs of the biometric data necessary for authentication.

Alternatively, the determination is made by calculating the matching score of each of the enrolled users $u_n$, calculating the likelihood ratio of each of the enrolled users $u_n$ by using the calculated matching scores, and comparing each of the likelihood ratios with a threshold. This method also significantly reduces (logically minimizes) the expected value of the number of inputs of the biometric data necessary for authentication.

Further, the prior probabilities of the enrolled users $u_n$ and the prior probability of the non-enrolled user $u_0$ are both set in advance, whereby not only the posterior probabilities of the enrolled user $u_n$ but also the posterior probability of the non-enrolled user $u_0$ is calculated. This method enables to clearly distinguish between the case in which the claimant v is identical to the non-enrolled user $u_0$ (forgery), and the case in which the claimant v is not identified (authentication failure). When the forgery user can be clearly recognized, it is possible to take measures (for example, such as presenting a warning information message, and stopping the operation of the sensor) to effectively prevent such a malicious user forgery.

These and other benefits are described throughout the present specification. A further understanding of the nature and advantages of the invention may be realized by reference to the remaining portions of the specification and the attached drawings.

BRIEF DESCRIPTION OF THE DRAWINGS

FIG. 5 is a schematic diagram showing the concept of authentication error rate in biometric identification;

DETAILED DESCRIPTION OF THE EMBODIMENTS

Hereinafter, preferred embodiments of the present invention will be described with reference to the accompanying drawings.

First Embodiment

A biometric authentication system 1 of this embodiment is a biometric authentication system that performs biometric identification between a claimant v and N enrolled users $u_n$ (n=1 to N), using plural biometric data. The claimant is a user to be identified through an authentication client terminal 100. The enrolled user is a user whose feature data of the biometric data is previously registered for the purpose of matching.

Figure 1:
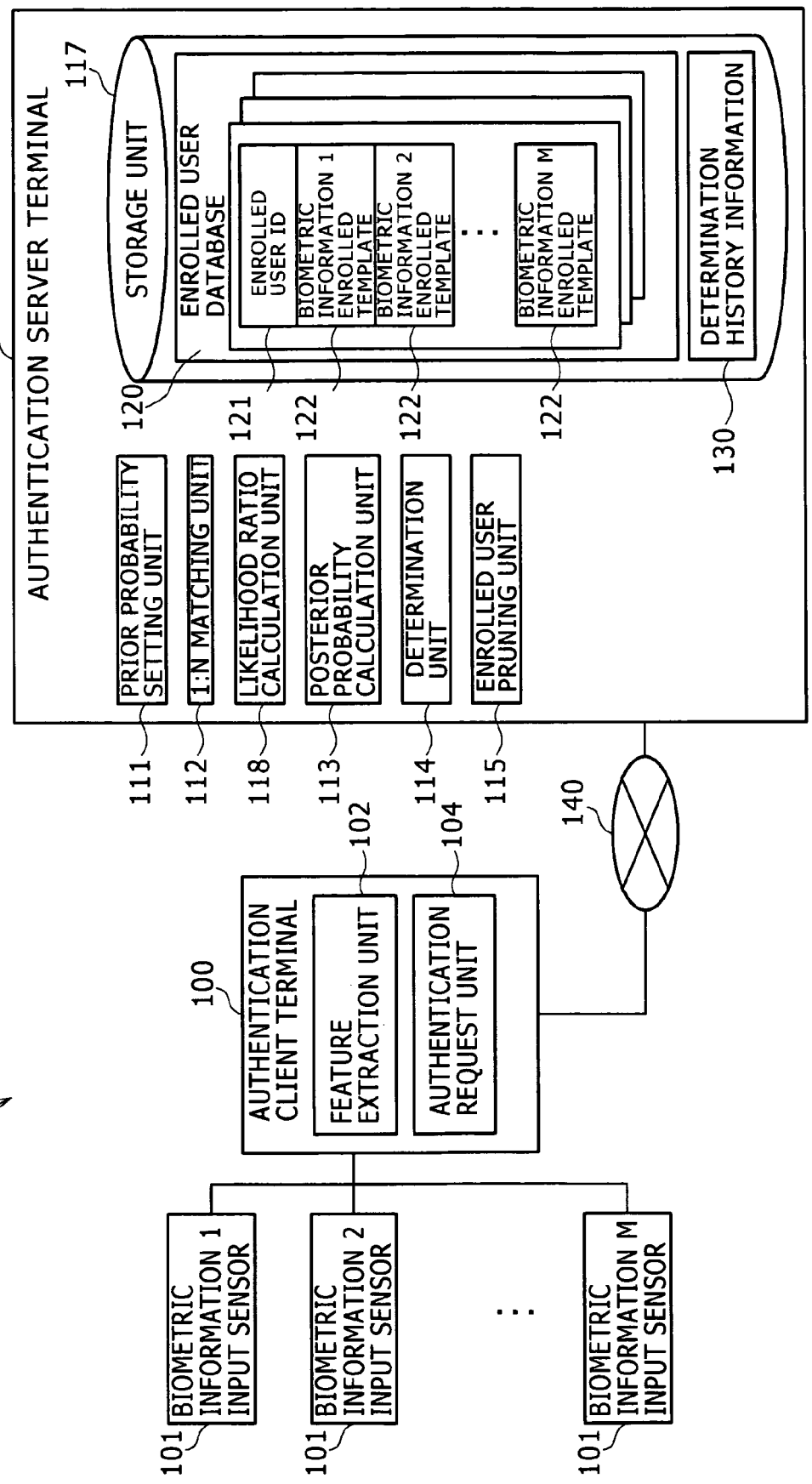
FIG. 1 is a diagram showing an example of the configuration of a biometric authentication system.

FIG. 1 shows an example of the configuration of the biometric authentication system 1. The biometric authentication system 1 includes the authentication client terminal 100 and an authentication server terminal 110. The authentication client terminal 100 acquires the feature data from the biometric data of the claimant v, and presents the information such as the authentication result to the claimant v. The authentication server 110 performs biometric identification or other processing. The authentication client terminal 100 and the authentication server terminal 110 are coupled through a network 140 so that data can be communicated between the two terminals.

The biometric authentication system 1 can be applied, for example, to a cardless credit payment system. In this case, the authentication client terminal 100 corresponds to an authentication apparatus installed in a member store, the authentication server terminal 110 corresponds to a server installed in a data center, and the network 140 corresponds to the Internet. Further, the biometric authentication system 1 can also be applied to an in-house time and attendance management system. In this case, the authentication client terminal 100 corresponds to an authentication apparatus installed in a room, the authentication server terminal 110 corresponds to a server installed in a server room, and the network 140 corresponds to a corporate intranet.

Incidentally, the network 140 may be not only a network using WAN, LAN and the like, but also a wired communication line using USB, IEEE 1394 and the like, a wireless communication line using a cellular phone network, Bluetooth and the like, or a combination of the wired and wireless communication lines.

The authentication client terminal 100 includes a feature extraction unit 102 and an authentication request unit 104. The feature extraction unit 102 and the authentication request unit 104 may be functionally realized by a central processing unit (CPU) executing a predetermined program (not shown) in the authentication client terminal 100, or may be realized by providing hardware having functions of the relevant processing units described later.

The biometric authentication system 1 further includes a plurality (M) of biometric information input sensors 101 coupled to the authentication client terminal 100. The biometric information input sensors 101 are devices for acquiring plural biometric data 1 to M from the claimant v.

Incidentally, the biometric information includes various types of information derived from human, such as fingerprint, voice pattern, iris pattern, handwriting, keystroke (the number of pressed keys) for inputting a predetermined character string through a keyboard, dynamic signature, and a way of walking. The dynamic signature is the biometric information including, for example, not only the information relating to handwriting shape (static signature), but also the information relating to dynamic feature such as speed of pen motion in signature writing.

Here, the type of biometric information that a single sensor can acquire is called modality. For example, as in the case of fingerprint collection, different types of biometric information may be acquired from different areas of the human body (for example, index finger and middle finger). Thus, it may happen that plural biometric information belonging to the same modality can be acquired by a single sensor 101. In this embodiment, it is assumed that authentication is performed using plural different types of biometric information belonging to plural modalities.

The feature extraction unit 102 extracts the feature data of a claimant v based on the biometric data acquired from the claimant v. Note that the feature data can be extracted by any conventional method.

The authentication request unit 104 requests the authentication server terminal 110 to identify the claimant v. Details of the determination method will described later with reference to FIG. 3.

Further, the authentication request unit 104 receives the determination result information about the result of the determination from the authentication server terminal 110, and performs processing according to the determination result information. Details of the processing will be described later.

The authentication server terminal 110 includes a storage unit 117, a prior probability setting unit 111, a 1:N matching unit 112, a likelihood ratio calculation unit 118, a posterior probability calculation unit 113, a determination unit 114, and an enrolled user pruning unit 115. Note that the prior probability setting unit 111, the 1:N matching unit 112, the likelihood ratio calculation unit 118, the posterior probability calculation unit 113, the determination unit 114, and the enrolled user pruning unit 115 may be functionally realized by a central processing unit (CPU) executing a predetermined program (not shown) in the authentication server terminal 110, or may be realized by providing hardware having functions of the relevant processing units. Further, the respective processing units are not necessarily separate from each other, and any of the plural processing units may be put together as a single unit.

The storage unit 117 stores a enrolled user database 120 for holding the ID of each of the enrolled users $u_n$, as well as the matching feature data (hereinafter referred to as "biometric information enrolled templates") 122 that are extracted from plural biometric information 1 to M for each of the enrolled users $u_n$. The storage unit 117 also stores determination history information 130 indicating the final determination results ("authentication success", "forgery", or "authentication failure") of D authentication attempts (where D is an integer of one or more). The storage unit 117 is realized by a memory device such as RAM or hard disk drive.

Figure 4:
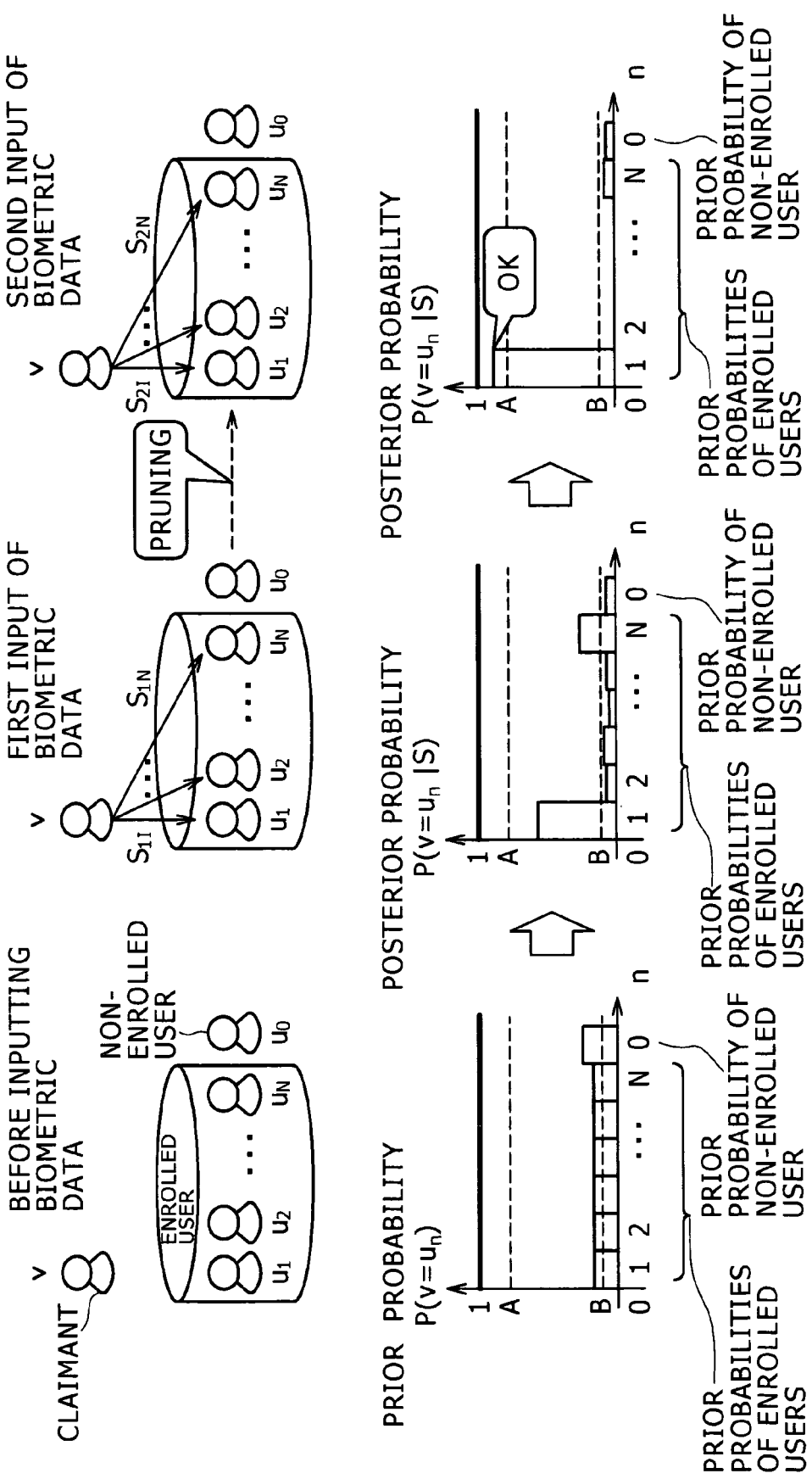
FIG. 4 is a schematic diagram showing the concept of authentication algorithm employed in the biometric authentication system.

The prior probability setting unit 111 initializes the prior probabilities of the enrolled users $u_n$ and the prior probability of the non-enrolled user $u_0$. In this embodiment, as shown in FIG. 4, the concept of non-enrolled user $u_0$ is introduced for the purpose of detecting forgery. Thus, the prior probability is also set to the non-enrolled user $u_0$. The prior probabilities of the enrolled users $u_n$ and the prior probability of the non-enrolled user $u_0$, are both probabilities set for the enrolled users $u_n$ and the non-enrolled user $u_0$, under the condition that no data (matching scores in this embodiment) is obtained. More specifically, when a certain claimant v performs the identify verification with the matching scores being unknown, the prior probabilities are $v=u_1$, $v=u_2$, and $v=u_n$, as well as $v=u_0$. In this embodiment, the prior probability setting includes the following methods. One involves using a predetermined fixed value (for example, a value included in the source code of a program) as the prior probability. The other involves previously setting a prior probability calculation formula to calculate prior probabilities according to the various data, such as the number of data in the enrolled user database 120 and the content of the determination history information 130. Details of the methods of setting prior probabilities will be described later.

The prior probability setting unit 111 updates the prior probabilities in the course of repeating the authentication process. More specifically, when the determination unit 114, to be described later, determines that the claimant v is a user (forgery user) other than the enrolled users $u_n$, the prior probability setting unit 111 increases the prior probability of the non-enrolled user $u_0$. Accordingly, the prior probability setting unit 111 reduces the prior probability of each of the enrolled users $u_n$ so that the sum of the prior probability of the non-enrolled user $u_0$ and the prior probability of each of the enrolled users $u_n$ is equal to one. This process may be performed immediately after the determination unit 114 determines "forgery", or in the next authentication process (for example, upon execution of step S302 described later with reference to FIG. 3). The effect obtained by increasing the prior probability of the non-enrolled user $u_0$ will be described later.

The 1:N matching unit 112 performs 1:N matching between the feature data of the claimant v that is extracted by the feature extraction unit 102 of the authentication client terminal 100, and the biometric information enrolled template 122 held in the enrolled user database 120. Then, the 1:N matching unit 112 obtains the matching score of each of the enrolled users $u_n$. The matching score can be obtained by any conventional method.

The likelihood ratio calculation unit 118 calculates the ratio of the likelihood $v=u_n$ to the likelihood $v \neq u_n$ with respect to each of the enrolled users $u_n$, based on the matching score obtained by the 1:N matching unit 112.

The posterior probability calculation unit 113 calculates the posterior probabilities of the enrolled users $u_n$ and the posterior probability of the non-enrolled user $u_0$, using the likelihood ratio calculated by the likelihood ratio calculation unit 113, and using the prior probabilities of both the enrolled users $u_n$ and the non-enrolled user $u_0$, which are set by the prior probability setting unit 111. The posterior probabilities of the enrolled users $u_n$ and the prior probability of the non-enrolled user $u_0$, are both conditional probabilities set for the enrolled users $u_n$ and the non-enrolled user $u_0$, under conditions that the data (the matching scores in this embodiment) are obtained and taken into account. More specifically, the posterior probabilities of the enrolled users $u_n$ and the posterior probability of the non-enrolled user $u_0$ are calculated, respectively, using the prior probabilities of the enrolled users $u_n$, the prior probability of the non-enrolled user $u_0$, and the likelihood ratios. Details of the posterior probability calculation method will be described later.

The determination unit 114 compares each of the posterior probabilities calculated by the posterior probability calculation unit 113, with a first threshold (threshold A), and verifies the identity of the claimant v according to the following criteria. That is, when the maximum value of the posterior probability is larger than the predetermined threshold A, and when the posterior probability showing the maximum value is one of the posterior probabilities of the enrolled users $u_n$, the determination unit 114 determines that the corresponding enrolled user and the claimant v are identical (authentication success), and outputs the determination result information indicating authentication success. On the other hand, when the posterior probability showing the maximum value is the posterior probability of the non-enrolled user $u_0$, the determination unit 114 determines that the claimant v is a user (forgery user) other than the enrolled users $u_n$, and outputs the information (forgery warning information) indicating the determination result. Further, when the maximum value of the posterior probability is equal to or less than the threshold A (namely, when it is undeterminable), and when the number of acquisitions of the biometric data from the claimant v is less than a predetermined value, the determination unit 114 outputs the information requesting to reacquire the biometric data of the claimant v, as the determination result information indicating that it is necessary to perform the identity verification again. On the other hand, when the number of acquisitions of the biometric data is equal to or more than the predetermined value, the determination unit 114 determines that the claimant v is not identified to any of the enrolled users $u_n$ (authentication failure), and outputs the determination result information indicating authentication failure.

When the determination unit 114 requests to reacquire the biometric data from the claimant v, the enrolled user pruning unit 115 compares each of the posterior probabilities calculated by the posterior probability calculation unit 113, with a second threshold (threshold B), and excludes the enrolled user(s) $u_n$ and non-enrolled user $u_0$ corresponding to the posterior probabilities smaller than the threshold B, from the target to be matched to the claimant v. The exclusion of the corresponding enrolled user $u_n$ and non-enrolled user $u_0$ from the target to be matched to the user v, is called the pruning of enrolled user $u_n$ and non-enrolled user $u_0$. With respect to the pruned enrolled user $u_n$ and the pruned non-enrolled user $u_0$, the given values such as the matching score, likelihood ratio, and posterior probability are not calculated in the subsequent authentication process. The target of the pruning may be limited to the enrolled users $u_n$.

Figure 2:
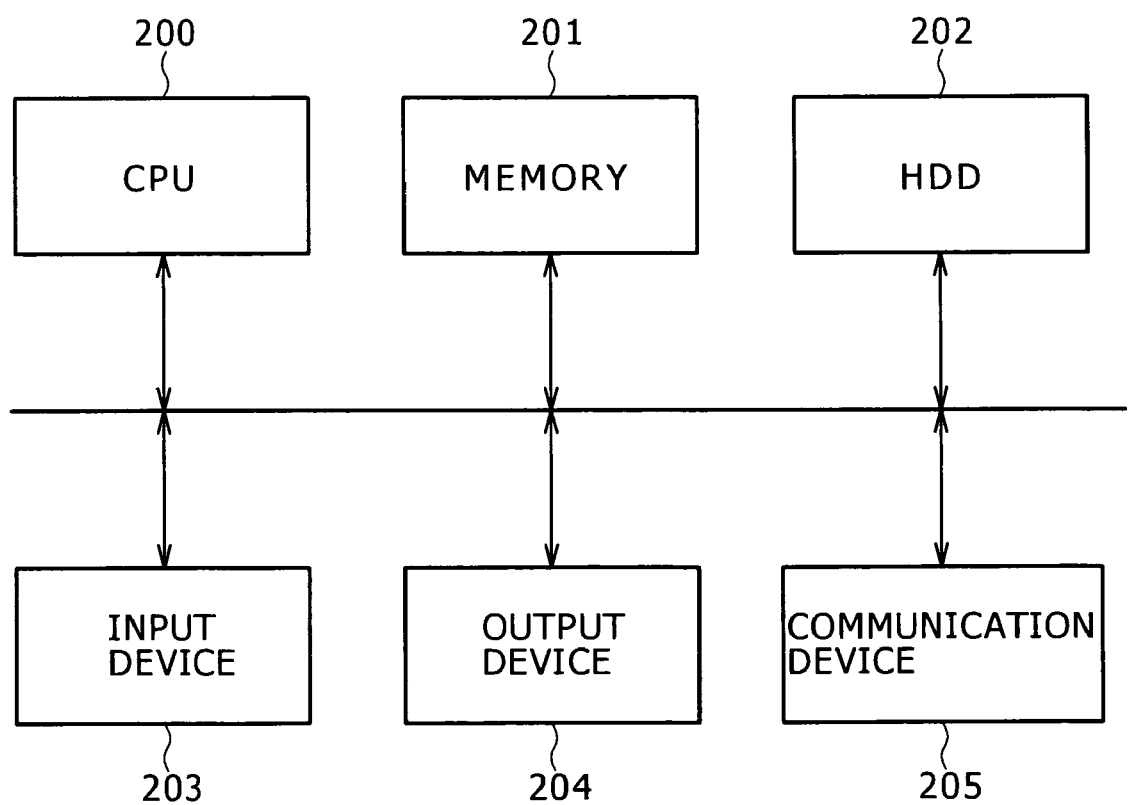
FIG. 2 is a diagram showing a hardware configuration of an authentication client terminal and an authentication server terminal.

FIG. 2 shows a hardware configuration of the authentication client terminal 100 and the authentication server terminal 110 in this embodiment. As shown in the figure, the authentication client terminal 100 and the authentication server terminal 110 can be configured using a typical information processor including a CPU 200, a memory (such as RAM) 201, an HDD 202, an input device (such as a keyboard and a mouse) 203, an output device (such as a display and a speaker) 204, and a communication device (such as a LAN adaptor or an infrared adaptor) 205.

Figure 3:
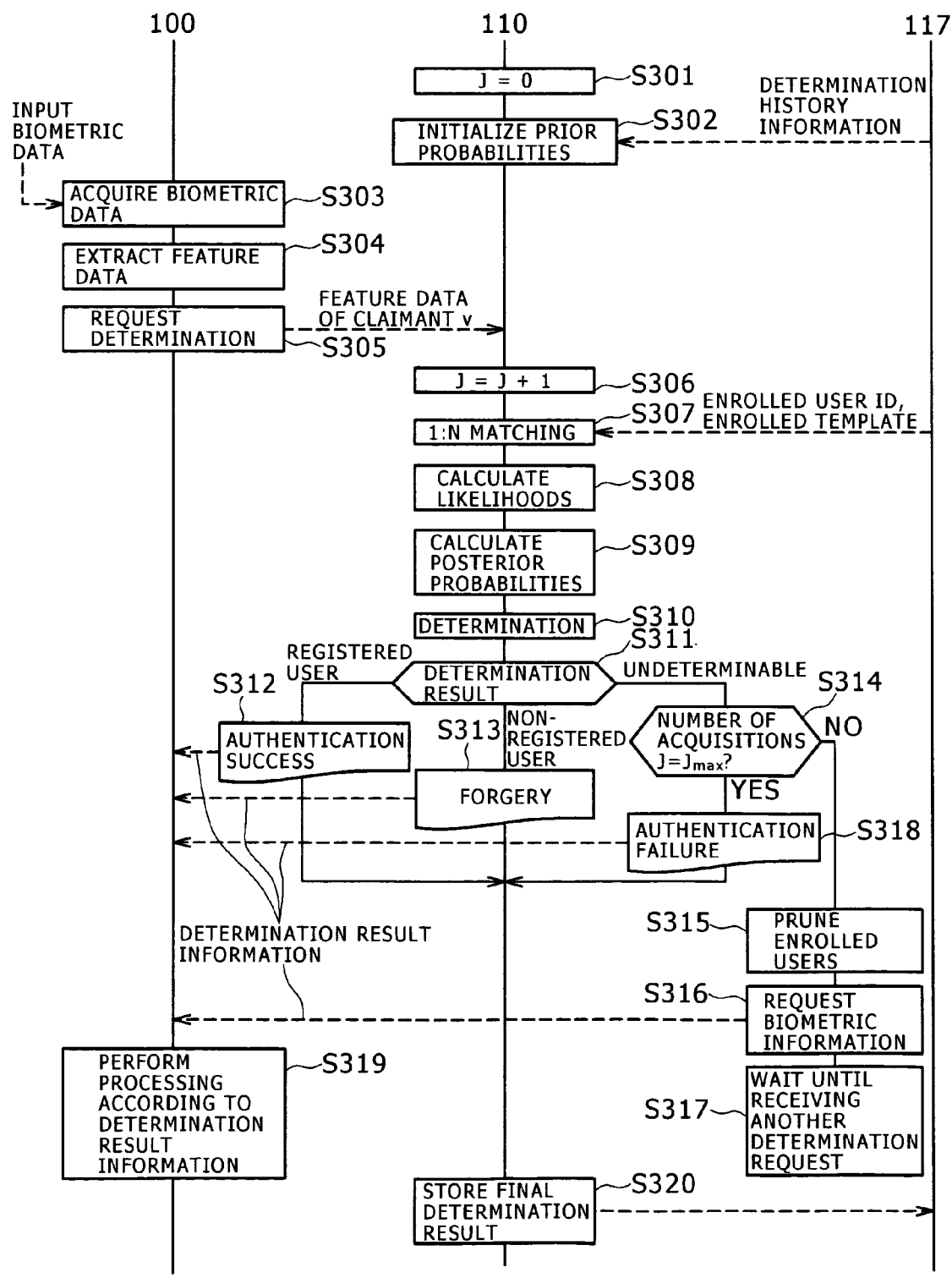
FIG. 3 is a diagram showing the procedure of the authentication process by the biometric authentication system.

FIG. 3 shows the procedure of the authentication process by the biometric authentication system 1 of this embodiment, and the data flow associated with the authentication process.

First, the authentication server terminal 110 initializes the number of inputs J of biometric data from the claimant v (J=0) (step S301). This process is performed, for example, by the determination unit 114.

Then, the prior probability setting unit 111 of the authentication server terminal 110 initializes the prior probability P (v=$u_n$) of each of the enrolled users $u_n$, as well as the prior probability P (v=$u_0$) of the non-enrolled user $u_0$ (step S302). The method for setting prior probabilities will be described below.

For example, the prior probability P (v=$u_n$) of each of the enrolled users $u_n$ (n=1 to N) and the prior probability P (v=$u_0$) of the non-enrolled user $u_0$ can be set to the same value as follows.

$$P(v=u_n)=1/(N+1)$$

$$P(v=u_0)=1/(N+1)$$

It is also possible that the prior probability P (v=$u_n$) of each of the enrolled users $u_n$ (n=1 to N) is given as $$P(v=u_n)=1/(N+1)$$

and that the prior probability P (v=$u_0$) of the non-enrolled user $u_0$ is given as $$P(v=u_0)=0$$

The prior probability of the non-enrolled user $u_0$ to 0, under the assumption that the claimant v is necessarily one of the N enrolled users $u_n$. This setting ensures that the claimant v is not identified as the non-enrolled user $u_0$.

For example, an entrance management apparatus is installed outside the entrance door of a room to control the unlocking and locking of the door by reading the information of an IC card, and an entrance/exit management system is established based on biometric identification to limit persons entering the room. In this case, when only the enrolled users $u_n$ can unlock the entrance door and hardly anyone would impersonate to unlock the entrance door, the prior probability of the non-enrolled user $u_0$ is set to 0 as described above. This ensures that the claimant v will not be identified as the non-enrolled user $u_0$ by mistake.

Further, the prior probability setting unit 111 of the authentication server terminal 110 increases the prior probability of the non-enrolled user $u_0$, based on the determination history information 130 stored in the storage unit 117. Accordingly, the prior probability setting unit 111 reduces the prior probability of each of the enrolled users $u_n$ so that the sum of the prior probability of the non-enrolled user $u_0$ and the prior probability of each of the enrolled users $u_n$ are equal to one. More specifically, in step S302, the prior probability setting unit 111 refers to the determination history information 130 stored in the storage unit 117. When the determination result from the determination unit 114 in the last authentication process is "forgery", the number of determinations of "forgery" in D attempts of authentication is given by $D_0$ and is obtained using the final determination results ("authentication successful", "forgery", or "authentication failure") of the D authentication attempts. Then, the prior probability P (v=$u_n$) of each of the enrolled users $u_n$ and the prior probability P (v=$u_0$) of the non-enrolled user $u_0$, are given as follows.

$$P(v=u_n)=(1-D_0/D)/(N+1)$$

$$P(v=u_0)=(N \times D_0/D+1)/(N+1)$$

As described above, because the prior probability setting unit 111 updates the prior probability values, even if a malicious claimant v, who has not been registered, repeats authentication attempt until forgery is achieved, the prior probability P (v=$u_0$) of the non-enrolled user $u_0$ increases each time the claimant v is identified as a user "forgery". As a result, the posterior probability P (v=$u_0$|S) of the non-enrolled user $u_0$ also increases as described later, making it more difficult to achieve authentication. This leads to the effect that the security of the system is further increased.

In an application with a high probability of forgery attacks by malicious users, the prior probability of the non-enrolled user $u_0$ can be set to a higher value to achieve high security.

As described above, the biometric authentication system of this embodiment flexibly controls the prior probability of the non-enrolled user $u_0$ by taking into account the possibility of forgery attacks. Thus, it is possible to achieve appropriate operation both in terms of availability and security according to the situation to which the system is applied.

In response to an input of biometric data from the claimant v (for example, by putting the index finger on the biometric information 1 input sensor 101 to present the fingerprint), the biometric information input sensor 101 of the authentication client terminal 100 acquires the biometric data of the claimant v (step S303). Here, the biometric information input sensor 101 may permit the acquisition of biometric data only once. In this embodiment, there is a risk that a user, whose biometric data is similar to another person's biometric data, repeatedly inputs the similar biometric data to gradually increase the posterior probability of the specific person, and is finally authenticated as the specific person, resulting in a decrease in security. However, as described above, by ensuring that the once input modality is not input twice, it is possible to prevent forgery of the user repeatedly inputting the same biometric data. In this way, security deterioration can be prevented.

The feature extraction unit 102 of the authentication client terminal 100 extracts the feature data of the claimant v, based on the biometric data acquired from the claimant v through the biometric information input sensor 101 (step S304).

The authentication request unit 104 of the authentication client terminal 100 transmits the claimant feature data extracted by the feature extraction unit 102, to the authentication server terminal 110 through the communication device 205. At the same time, the authentication request unit 104 requests the authentication server terminal 110 to identify the claimant v (step S305).

Upon receiving the claimant feature data from the authentication client terminal 100, the authentication server terminal 110 increments the number of inputs J of the biometric data from the claimant v to J=J+1 (step S306). This process is performed, for example, by the determination unit 114.

Next, the 1:N matching unit 112 of the authentication server terminal 110 performs 1:N matching between the claimant feature data extracted by the feature extraction unit 102 of the authentication client terminal 100, and the enrolled template 122 held in the enrolled user database 120 with respect to each of the N enrolled users $u_n$. Then, the 1:N matching unit 112 calculates the matching score $s_{Jn}$ of each of the enrolled users $u_n$ (step S307). An example of the method for calculating matching scores is the method of measuring the distance in the feature space. However, any other calculation methods may be used. Incidentally, with respect to the pruned enrolled user $u_n$, the matching process is not performed and the matching score is not calculated. Thus, the process is speeded up.

Then, the likelihood ratio calculation unit 118 of the authentication server terminal 110 calculates the ratio of the likelihood $v=u_n$ to the likelihood $v \neq u_n$ (the likelihood ratio) with respect to each of the enrolled users $u_n$, using the matching scores calculated by the 1:N matching unit 112 (step S308). Before calculating likelihood ratios it is necessary to calculate the matching scores of all the enrolled users $u_n$. However, the likelihood ratio of the pruned enrolled user $u_n$ is not calculated and its matching score is not necessary. In this way, the process of calculating the likelihood ratio of the pruned enrolled user $u_n$ can be eliminated to speed up the authentication process.

The posterior probability calculation unit 113 of the authentication server terminal 110 calculates the posterior probability $P(v=u_n|S)$ of each of the enrolled users $u_n$ and the posterior probability $P(v=u_0|S)$ of the non-enrolled user $u_0$, using the likelihood ratios calculated by the likelihood ratio calculation unit 118, and using the prior probabilities of both the enrolled users $u_n$ and the non-enrolled user $u_0$, which are set by the prior probability setting unit 111 (step S309). Here, $S=[s_{jn}|j=1$ to $J, n=1$ to $N]$.

At this time, when the posterior probability $P(v=u_0|S)$ of the non-enrolled user $u_0$, which is calculated in the current acquisition of the biometric data, is higher than the posterior probability in the previous (J−1)th acquisition of the biometric data (or higher than the prior probability when J=1), N matching scores ($s_{J1}, s_{J2}, \ldots, s_{JN}$) calculated from the feature data extracted in the current acquisition, may not be used in the posterior probability calculation in the (J+1)th and subsequent acquisitions. In this embodiment, when a enrolled user attempts authentication under bad conditions involving the posture of inputting the biometric data (such as the finger position and the face direction), the lighting environment, and the like, the posterior probability of the enrolled user decreases each time the enrolled user inputs the biometric data. This even makes it difficult to correctly authenticate the enrolled user, even resulting in a decrease in availability. When the conditions such as the posture and the lighting environment are bad, the input biometric data is not similar to any of the biometric data of the enrolled users. Thus, the posterior probability of the non-enrolled user increases. As described above, when the posterior probability of the non-enrolled user in the current acquisition is higher than the posterior probability in the previous acquisition, the matching score calculated from the feature data extracted in the acquisition at this time, is not used in the subsequent calculation of posterior probabilities. In this way, it is possible to prevent a decrease in availability when the biometric data is input under bad conditions involving the posture of inputting the biometric data, the lighting environment, and the like. Hereinafter, a description will be given of the method for calculating the likelihood ratio, the posterior probability $P(v=u_n|S)$ of each of the enrolled users $u_n$, as well as the posterior probability $P(v=u_0|S)$ of the non-enrolled user $u_0$.

The posterior probability $P(v=u_n|S)$ of each of the enrolled users $u_n$, and the posterior probability $P(v=u_0|S)$ of the non-enrolled user $u_0$ can be transformed into the following equations, respectively, using the Bayesian theory.

$$P(v = u_n | S) = \frac{P(v=u_n)P(S|v=u_n)}{P(S)} \quad (2)$$

$$= \frac{P(v=u_n)P(S|v=u_n)}{\sum_{x=0}^{N} P(v=u_x)P(S|v=u_x)}$$

$$P(v = u_0 | S) = \frac{P(v=u_0)P(S|v=u_0)}{P(S)} \quad (3)$$

$$= \frac{P(v=u_0)P(S|v=u_0)}{\sum_{x=0}^{N} P(v=u_x)P(S|v=u_x)}$$

Here, the distribution of the first person to first person matching score s (first-person distribution) is given by f(s), and the distribution of the first person to third person matching score s (third-person distribution) is given by g(s). Each of f(s) and g(s) can be calculated from the likelihood ratio assuming a normal distribution, Bayesian estimation, logistic regression or other statistical methods, as described in C. M. Bishop, "Pattern Recognition and Machine Learning", Springer-Verlag; New Edition (2006) (the disclosure of this document is incorporated herein by reference in its entirety). In this embodiment, f(s) and g(s) may be calculated for each enrolled user, or may be shared by all the enrolled users.

Using these, $P(S|v=u_n)$ and $P(S|v=u_0)$ can be expressed by the following equations, respectively.

$$P(S|v=u_n) = \prod_{j=1}^{J} \prod_{i=1}^{N} P(S_{ji}|v=u_n) \quad (4)$$

$$= \prod_{j=1}^{J} f(S_{jn}) \prod_{i=1, i \neq n}^{N} g(S_{ji})$$

$$P(S|v=u_0) = \prod_{j=1}^{J} \prod_{i=1}^{N} P(S_{ji}|v=u_i) \quad (5)$$

$$= \prod_{j=1}^{J} \prod_{i=1}^{N} g(S_{ji})$$

Thus, by substituting the above equations into equations (2) and (3), the posterior probability $P(v=u_n|S)$ of each of the enrolled users $u_n$ and the posterior probability $P(v=u_0|S)$ of the non-enrolled user $u_0$ can be expressed by the following equations (posterior probability calculation functions), respectively.

$$P(v=u_n|S) = \frac{P(v=u_n) \prod_{j=1}^{J} f(S_{jn}) \prod_{i=1, i \neq n}^{N} g(S_{ji})}{\sum_{x=1}^{N} P(v=u_x) \prod_{j=1}^{J} f(S_{jx}) \prod_{i=1, i \neq x}^{N} g(S_{ji}) + P(v=u_0) \prod_{j=1}^{J} \prod_{i=1}^{N} g(S_{ji})} \quad (6)$$

$$= \frac{P(v=u_n) \prod_{j=1}^{J} f(S_{jn})/g(S_{ji})}{\sum_{x=1}^{N} P(v=u_x) \prod_{j=1}^{J} f(S_{jx})/g(S_{jx}) + P(v=u_0)}$$

-continued $$P(v = u_0 \mid S) = \frac{P(v = u_0) \prod_{j=1}^{J} \prod_{i=1}^{N} g(S_{ji})}{\sum_{x=1}^{N} P(v = u_x) \prod_{j=1}^{J} f(S_{jx}) \prod_{i=1, i \neq x}^{N} g(S_{ji}) + P(v = u_0) \prod_{j=1}^{J} \prod_{i=1}^{N} g(S_{ji})}$$

$$= \frac{P(v = u_0)}{\sum_{x=1}^{N} P(v = u_x) \prod_{j=1}^{J} f(S_{jx}) / g(S_{jx}) + P(v = u_0)}$$ (7)

Here, the following equation included in the equations is the equation (likelihood ratio function) to calculate the likelihood ratio (the ratio of the likelihood $v = u_n$ to the likelihood $v \neq u_n$), under the condition that the matching scores $s_{1n}$ to $s_{Jn}$ corresponding to the enrolled users $u_n$ are obtained.

$$\prod_{j=1}^{J} f(S_{jn}) / g(S_{jn})$$ (8)

The likelihood ratio calculation unit 118 calculates likelihood ratios using the likelihood ratio function described above.

Then, the posterior probability calculation unit 113 calculates the posterior probability of each of the enrolled users $u_n$ and the posterior probability of the non-enrolled user $u_0$, using the likelihood ratios calculated by the likelihood ratio calculation unit 118 using the above posterior probability calculation functions. Note that since the posterior probabilities of the pruned enrolled user $u_n$ and non-enrolled user $u_0$ are not calculated, the authentication process can be speeded up. Further, before calculating likelihood ratios it is necessary to calculate the matching scores of all the enrolled users $u_n$. However, the matching score of the pruned enrolled user $u_n$ is not calculated as described above. At this time, the likelihood ratio of the pruned enrolled user $u_n$ may be set to 0, or may be the same as the likelihood ratio calculated in the likelihood ratio calculation process (step S308) just before pruning. By eliminating the process of calculating the matching score, the likelihood ratio, and the posterior probability with respect to the pruned enrolled user $u_n$ (and the pruned non-enrolled user $u_0$ when the non-enrolled user $u_0$ is also the target to be pruned), the authentication process can be speeded up.

Another approach is described in Vladimir P. Dragalin, et al., "Multihypothesis Sequential Probability Ratio Tests, PART I: Asymptotic Optimality", IEEE Trans., Information Theory, Volume 45, Issue 7, pp. 2448-2461 (1999) (the disclosure of this document is incorporated herein by reference in its entirety). This shows that in testing to determine which is true of L ($\geq 2$) hypotheses, under the assumption that the observational data is i.i.d. (independently following the same distribution) and that the decision error probabilities are sufficiently small, the likelihood ratio of each hypothesis is normalized to the probability value of achieving the specific hypothesis. The determination is made by comparing each of the probability values with a threshold A, thereby enabling to minimize the average number of observations necessary until the determination is completed.

In this embodiment, the ratio of the likelihood $v = u_n$ to the likelihood $v \neq u_n$ is calculated with respect to each of the enrolled users $u_n$. The calculated likelihood ratios are normalized to the posterior probabilities of the enrolled user $u_n$, and to the posterior probability of the non-enrolled user $u_0$. Then, the determination is made by comparing each of the posterior probabilities with the threshold A. This method minimizes the expected value of the number of inputs of the biometric data necessary for authentication.

As shown in FIG. 4 (the figure showing the first biometric data input), the determination unit 114 of the authentication server terminal 110 compares each of the posterior probabilities calculated by the posterior probability calculation unit 113 in step S309, with the threshold A. Then, the determination unit 114 verifies the identity of the claimant v according to the above described criteria (the description on the determination unit 114 in FIG. 1) (step S310).

In this embodiment, the threshold A used in the determination process is set to a value larger than 0.5. This setting of the threshold A ensures that the number of posterior probabilities exceeding the threshold A is not more than one. Because the number of posterior probability exceeding the threshold A is not more than one, a difference naturally occurs between the maximum value of the posterior probability and the next larger value of the posterior probability. Thus, it is possible to reduce the occurrence of misidentification (and increase security). This effect is increased by further increasing the value of the threshold A.

As described above, the biometric authentication system 1 of this embodiment calculates the likelihood ratios and the posterior probabilities, using the first-person matching score distribution and the third-person matching score distribution. The first-person matching score distribution f(s) and the third-person matching score distribution g(s) are estimated using the matching scores of all the enrolled users $u_n$, instead of using the matching score of a single enrolled user $u_n$. For this reason, the distributions can be reliably estimated even if the amount of the matching score data previously collected from each of the enrolled users $u_n$ is small. Thus, the likelihood ratio and the posterior probability can be reliably estimated, and EFAR, EFRR, NFAR can be reduced. As a result, the security of the system is increased, and its availability is further increased.

Next, the determination unit 114 of the authentication server terminal 110 separates into the following processes according to the determination result in step S310.

That is, when it is determined that the claimant v is identical to one of the enrolled users $u_n$ (authentication success) in step S310, the determination unit 114 transmits the determination result information indicating authentication success, to the authentication client terminal 100 through the communication device 205 (FIG. 2) (step S312). Further, when the biometric authentication system 1 is applied to the cardless credit payment system, the payment process and other related processes are performed. When the biometric authentication system 1 is applied to the time and attendance system, the door unlocking process, the automatic clock-in process, and other related processes are performed.

In step S310, when it is determined that the claimant v is the non-enrolled user $u_0$ (forgery user), the determination unit 114 transmits the forgery warning information to the authentication client terminal 100 through the communication device 205 (FIG. 2) (step S313).

If indeterminable in step S310, the determination unit 114 determines whether the number of acquisitions J of the biometric data from the claimant v is less than the predetermined value (J<$J_{max}$) (step S314).

When the result of the determination in step S314 is "Yes", in other words, when the number of acquisitions J of the biometric data does not reach the predetermined value yet, the enrolled user pruning unit 115 compares each of the posterior probabilities calculated by the posterior probability calculation unit 113, with the threshold B. Then, the enrolled user pruning unit 115 prunes the enrolled user $u_n$ and non-enrolled user $u_0$ corresponding to the posterior probabilities smaller than the threshold B (step S315).

For example, the authentication server terminal 110 is configured that the ID of the enrolled user $u_n$ pruned away in step S315 is held in the memory. With this configuration, the respective processing units of the authentication server terminal 110 can recognize the pruned enrolled user $u_n$. When the pruning of enrolled users $u_n$ is performed, the matching targets are narrowed down, for example, as in the case of FIG. 4 in which although all the enrolled users $u_n$ and non-enrolled user no are the matching targets in the first biometric data input, only the enrolled users $u_{n-1}$, $u_{n-N}$ and the non-enrolled user $u_0$, are the matching targets in the second biometric data input.

With the biometric authentication system 1 of this embodiment, the pruning is performed based on comparing the threshold B to the normalized posterior probability of each of the enrolled users $u_n$, and to the normalized posterior probability of the non-enrolled user $u_0$. Thus, as described in the Vladimir P. Dragalin, et al., it is possible to minimize the expected value of the number of inputs J of the biometric data necessary for pruning the corresponding enrolled users $u_n$ and non-enrolled user no. This is the same meaning as maximizing the expected value of the number of enrolled users $u_n$ and non-enrolled user $u_0$ to be pruned away when the input number J is a certain value. Thus, the time for 1:N matching can be reduced, and availability can be further increased.

After the pruning process (step S315), the authentication server terminal 110 (more specifically, for example, the determination unit 114) outputs the information requesting to reacquire the biometric data of the claimant v, as the determination result information indicating that it is necessary to perform the identity verification again, to the authentication client terminal 100 through the communication device 205 (FIG. 2) (step S316).

Then, the authentication server terminal 110 waits until another determination request is issued from the authentication client terminal 100, in other words, until the claimant feature is transmitted from the authentication client terminal 100 (step S317). Upon receiving the claimant feature data from the authentication client terminal 100, the authentication server terminal 110 performs the processes in step S306 and the subsequent steps.

On the other hand, when the determination result in step S314 is "No", in other words, when the number of acquisitions J of the biometric data reaches the predetermined value, the authentication server terminal 110 outputs the determination result information indicating authentication failure, and transmits the information to the authentication client terminal 100 through the communication device (FIG. 2) (step S318).

The authentication request unit 104 of the authentication client terminal 100 performs, for example, the following processes according to the determination result information transmitted from the authentication server terminal 110 (step S319).

When receiving the determination result information indicating authentication success, the authentication request unit 104 presents (for example, displays or voices) a message saying "Authentication is successful", to the claimant v through the output device 204.

When receiving the forgery warning information, the authentication request unit 104 provides punishment for the forgery user, such as stopping the operation of the biometric information input sensor 101 to reject the authentication attempt, or alarming through the output device 204.

When receiving the determination result information requesting to reacquire the biometric data, the authentication request unit 104 presents (for example, displays or voices) a message to ask the claimant v to input the biometric data, through the output device 204, such as saying "Put the index fingerprint on the sensor".

When receiving the determination result information indicating authentication failure, the authentication request unit 104 presents (for example, displays or voices) a message to ask the claimant v to reattempt to perform the identity verification, through the output device 204, such as saying "Authentication is failed. Start again from the beginning".

In the authentication server terminal 110, the determination unit 114 obtains the final determination result ("authentication success", "forgery", or "authentication failure"), and records the final determination result to the determination history information 130 stored in the storage unit 117 (step S320).

In the biometric authentication system 1 of this embodiment, the prior probabilities of the enrolled users $u_n$ and the prior probability of the non-enrolled user $u_0$ are set in advance. Whereby, not only the posterior probabilities of the enrolled users $u_n$ but also the posterior probability of the non-enrolled user $u_0$ is calculated using the prior probabilities and the likelihood ratios. When the claimant v is identified as the non-enrolled user $u_0$, the system determines "forgery". When the claimant v is not identified (not identified as the enrolled user $u_n$ or the non-enrolled user $u_0$), the system determines "authentication failure". The two cases "forgery" and "authentication failure" are clearly distinguished, so that it is possible to provide punishments such as the processes in step S319, only when the system determines that the claimant v not previously registered is attempting forgery. This can effectively prevent malicious user forgery, and can increase the security of the system.

Second Embodiment

In this embodiment, authentication is performed using plural different types of biometric information belonging to the same modality. The second embodiment will be described below focusing on the difference from the first embodiment.

In step S307 of FIG. 3, the 1:N matching unit 112 of the authentication server terminal 110 performs 1:N matching between the claimant feature data extracted by the feature extraction unit 102 of the authentication client terminal 100, and M enrolled templates 122 held in the enrolled user database 120 with respect to each of N enrolled users $u_n$. Then, the 1:N matching unit 112 calculates the matching score $s_{jnm}$ of the m-th enrolled template with respect to each of the enrolled users $u_n$. In the following description, the distance in the feature space is used as the method for calculating matching scores. In this case, the smaller the matching score the better. In other words, the smaller the matching score, the more two biometric information sources are likely to be identical. At this time, authentication failure is determined when the smallest matching score is obtained several times with respect to the same biometric data of the same user until this (J-th) input. For example, assuming that the number of inputs is two, authentication failure is determined when the biometric data indicating the smallest matching score in a certain input is identical to the biometric data indicating the smallest matching score in the other input.

There is a risk that a user, whose biometric data is similar to another person's biometric data, repeatedly inputs the similar biometric data to gradually increase the posterior probability of the specific person, and is finally authenticated as the specific person, resulting in a decrease in security. This embodiment uses only one modality, and it is difficult to take measures to ensure that the once input modality will not be input twice. However, as described above, authentication failure is determined when the smallest matching score is obtained several times with respect to the same biometric data, to prevent forgery of a user repeatedly inputting the same biometric data. In this way, it is possible to prevent a decrease in security.

However, in the above described case, authentication failure is typically determined when the claimant inputs the same biometric data multiple times. This results in a decrease in availability. In order to avoid this disadvantage, when a smallest matching score is obtained multiple times (K times) with respect to the same biometric data until this (J-th) input, ((K−1)×N×M) matching scores obtained in inputs other than the input achieving the most smallest matching score, are not used in the likelihood ratio calculation in step S308. This prevents forgery of a user repeatedly inputting the same biometric data to gradually increase the posterior probability. At the same time, it is possible to avoid the problem of authentication failure typically occurring when the claimant inputs the same biometric data multiple times. As a result, it is possible to prevent a decrease in security and availability.

In steps S308 and S309, the likelihood ratio, the posterior probability P ($v=u_n|S$) of each of the enrolled users $u_n$, as well as the posterior probability P ($v=u_0|S$) of the non-enrolled user $u_0$ are respectively calculated as follows. Here, $S=[s_{jnm}|j=1$ to J, $n=1$ to N, $m=1$ to M]

The posterior probability P ($v=u_n|S$) of each of the enrolled users $u_n$ and the posterior probability P ($v=u_0|S$) of the non-enrolled user $u_0$ can be transformed into the following equations, respectively, using the Bayesian theory.

$$P(v = u_n \mid S) = \frac{P(v = u_n)P(S \mid v = u_n)}{P(S)} \quad (9)$$

$$= \frac{P(v = u_n)P(S \mid v = u_n)}{\sum_{x=0}^{N} P(v = u_x)P(S \mid v = u_x)}$$

$$P(v = u_0 \mid S) = \frac{P(v = u_0)P(S \mid v = u_0)}{P(S)} \quad (10)$$

$$= \frac{P(v = u_0)P(S \mid v = u_0)}{\sum_{x=0}^{N} P(v = u_x)P(S \mid v = u_x)}$$

Here, assuming that the probability that the claimant will input the m-th biometric data (m=1, 2, ... M) is all equal to 1/M, P ($v=u_n|S$) and P ($v=u_0|S$) are given by the following equations, respectively.

$$P(S \mid v = u_n) = \prod_{j=1}^{J} \prod_{i=1}^{N} \prod_{k=1}^{M} P(S_{jik} \mid v = u_n) \quad (11)$$

$$= \prod_{j=1}^{J} \prod_{i=1}^{N} \prod_{k=1}^{M} \left\{ \frac{1}{M} \sum_{m=1}^{M} P(S_{jik} \mid v = u_n, \text{Input } m\text{-th biometric information for } J\text{-th input}) \right\}$$

$$= \prod_{j=1}^{J} \left\{ \frac{1}{M} \sum_{m=1}^{M} f(S_{jnm}) / g(S_{jnm}) \right\} \prod_{i=1}^{N} \prod_{k=1}^{M} g(S_{jik})$$

$$P(S \mid v = u_0) = \prod_{j=1}^{J} \prod_{i=1}^{N} \prod_{k=1}^{M} P(S_{jik} \mid v = u_0) \quad (12)$$

$$= \prod_{j=1}^{J} \prod_{i=1}^{N} \prod_{k=1}^{M} g(S_{jik})$$

Thus, by substituting equations (11) and (12) into equations (9) and (10), the posterior probability P ($v=u_n|S$) of each of the enrolled users $u_n$ and the posterior probability P ($v=u_0|S$) of the non-enrolled user $u_0$ are given by the following equations (posterior probability functions), respectively.

$$P(v = u_n \mid S) = \frac{P(v = u_n) \prod_{j=1}^{J} \left\{ \frac{1}{M} \sum_{m=1}^{M} f(S_{jnm}) / g(S_{jnm}) \right\}}{\sum_{x=1}^{N} P(v = u_x) \prod_{j=1}^{J} \left\{ \frac{1}{M} \sum_{m=1}^{M} f(S_{jxm}) / g(S_{jxm}) \right\} + P(v = u_0)} \quad (13)$$

$$P(v = u_0 \mid S) = \frac{P(v = u_0)}{\sum_{x=1}^{N} P(v = u_x) \prod_{j=1}^{J} \left\{ \frac{1}{M} \sum_{m=1}^{M} f(S_{jxm}) / g(S_{jxm}) \right\} + P(v = u_0)} \quad (14)$$

Here, the following equation included in the above posterior probability calculation functions, is the equation (likelihood ratio function) to calculate the likelihood ratio (the ratio of the likelihood $v=u_n$ to the likelihood $v \neq u_n$), under the condition that the matching scores $s_{1nm}$ to $s_{Jnm}$ corresponding to the m-th biometric data of the enrolled users $u_n$, are obtained.

$$\prod_{j=1}^{J} \left\{ \frac{1}{M} \sum_{m=1}^{M} f(S_{jnm}) / g(S_{jnm}) \right\} \quad (15)$$

The likelihood ratio calculation unit 118 calculates likelihood ratios using the likelihood ratio function in step S308. Then, the posterior probability calculation unit 113 calculates the posterior probability of each of the enrolled users $u_n$ and the posterior probability of the non-enrolled user $u_0$, using the likelihood ratios calculated by the likelihood ratio calculation unit 118 using the posterior probability calculation functions.

Third Embodiment

A biometric authentication system 2 of this embodiment is a cardless credit payment system. The third embodiment will be described below focusing on the difference from the first embodiment.

Figure 7:
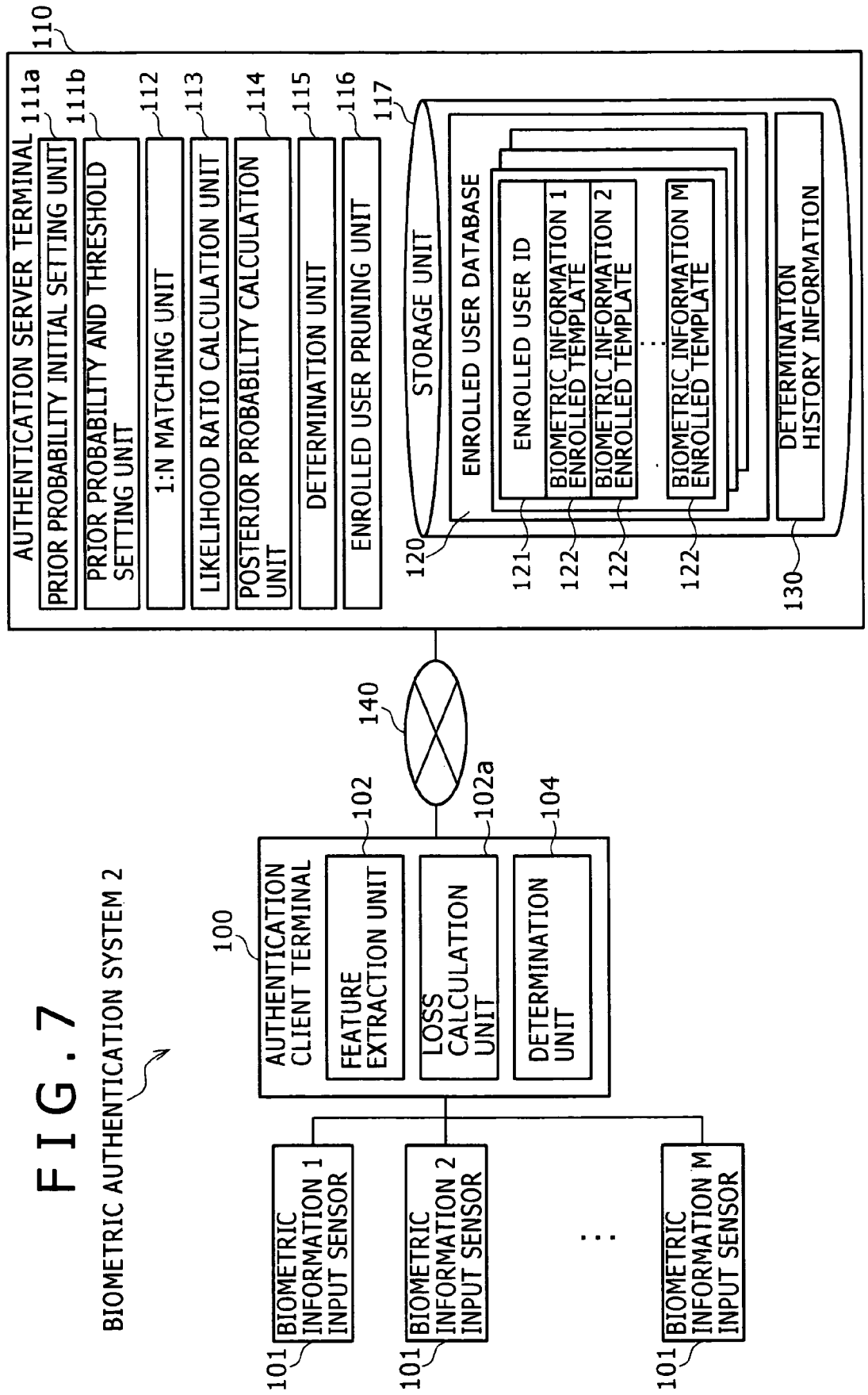
FIG. 7 is a diagram showing an example the configuration of still another biometric authentication system.

FIG. 7 shows an example of the configuration of the biometric authentication system 2.

A loss calculation unit 102a calculates a loss $W_1$ occurring when v is a enrolled user and is identified as another enrolled user, and a loss $W_0$ occurring when v is a non-enrolled user and is identified as a certain enrolled user, based on the price Q of a product the claimant v purchased.

A prior probability initial setting unit 111a initializes the posterior probabilities of the enrolled users $u_n$ and the posterior probability of the non-enrolled user $u_0$.

A prior probability and threshold setting unit 111b sets the prior probability of each of the enrolled users $u_n$ and a corresponding threshold, as well as the prior probability of the non-enrolled user $u_0$ and a corresponding threshold, using the losses $W_1$ and $W_0$. So this ensures that both EFRR and the expected value $R_n$ of the loss when v is identified as the n-th enrolled user, are equal to or less than the desired values EFRR' and $R_n'$, respectively. In this embodiment, the threshold is set for each enrolled user and non-enrolled user.

Figure 8:
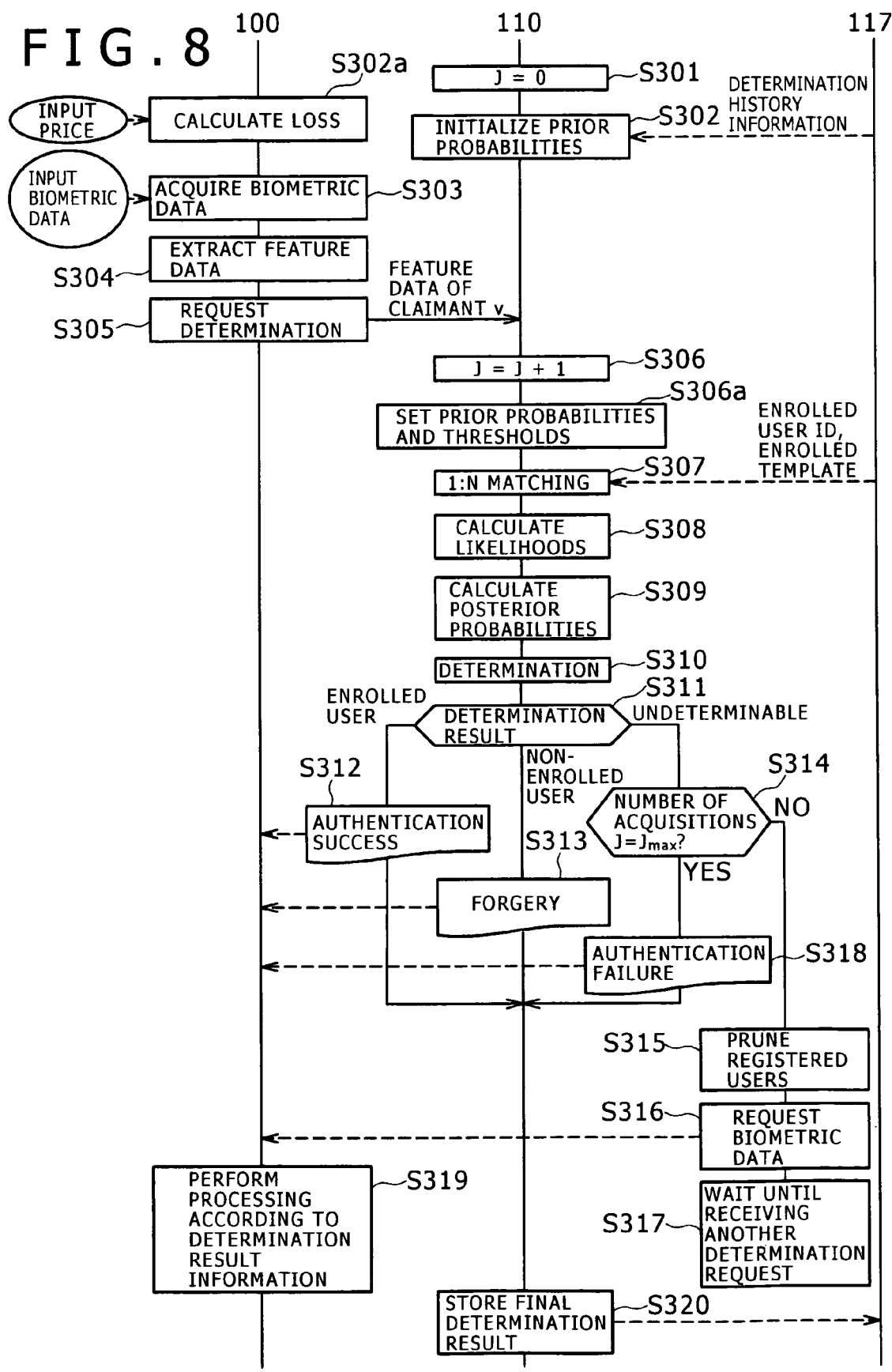
FIG. 8 is a diagram showing the procedure of the authentication process by still another biometric authentication system.

FIG. 8 shows the procedure of the authentication process by the biometric authentication system 2 of this embodiment, and the data flow associated with the authentication process.

In step S302, the prior probability initial setting unit 111a of the authentication server terminal 110 initializes the prior probability P ($v=u_n$) of each of the enrolled users $u_n$, as well as the prior probability P ($v=u_0$) of the non-enrolled user $u_0$. Here, the initial values of the prior probabilities P ($v=u_n$) and P ($v=u_0$) are given by $\pi_n$, $\pi_0$, respectively.

In step S302a, the loss calculation unit 102a of the authentication client terminal 100 calculates the loss $W_1$ occurring when v is a enrolled user and is identified as another enrolled user, and the loss $W_0$ occurring when v is a non-enrolled user and is identified as a certain enrolled user, based on the price Q of a product the claimant v purchased. The price Q is input, for example, by a store clerk through a keyboard. The losses $W_1$ and $W_0$ are, for example, assumed to be proportional to the price Q, and are calculated using the following equations, where $\alpha$, $\beta$ are invariables.

$$W_1 = \alpha Q \tag{16}$$

$$W_0 = \beta Q \tag{17}$$

In step S305, the authentication request unit 104 of the authentication client terminal 100 transmits the claimant feature data extracted by the feature extraction unit 102, as well as the losses $W_1$ and $W_0$ calculated by the loss calculation unit 102a, to the authentication server terminal 110 through the communication device 205. At the same time, the authentication request unit 104 requests the authentication server terminal 110 to identify the claimant v.

In step S306a, the prior probability and threshold setting unit 111b of the authentication server terminal 110 sets the prior probability P ($v=u_n$) of each of N enrolled users $u_n$ and a threshold $A_n$, as well as the prior probability P ($v=u_0$) of the non-enrolled user $u_0$ and a threshold $A_0$, using the losses $W_1$ and $W_0$ received from the authentication client terminal 100. So this ensures that both EFRR and the expected value $R_n$ of the loss when v is identified as the n-th enrolled user, are equal to or less than the desired values EFRR' and $R_n'$, respectively. The prior probabilities and the thresholds are given by the following equations.

$$P(v = u_n) = \frac{\pi_n W_1}{\sum_{k=1}^{N} \pi_k W_1 + \pi_0 W_0} \tag{18}$$

$$A_n = \frac{W_1 \exp[a_n]}{1 + W_1 \exp[a_n]} \tag{19}$$

$$P(v = u_0) = \frac{\pi_0 W_0}{\sum_{k=1}^{N} \pi_x W_1 + \pi_0 W_0} \tag{20}$$

$$A_0 = \frac{W_0 \exp[a_0]}{W_1 + W_0 \exp[a_0]} \tag{21}$$

Incidentally, $a_n$ and $a_0$ are variables expressed by the following equations.

$$a_n = \log\left[\frac{\pi_n}{R_n'}\right] \tag{22}$$

$$a_0 = \log\left[\frac{\pi_0}{(1-\pi_0)EFRR'}\right] \tag{23}$$

When the prior probabilities and the thresholds are set as described above, EFRR and $R_n$ are equal to or less than the desired values EFRR' and $R_n'$, respectively. This can be proved as follows.

According to the Vladimir P. Dragalin, et al., the expected value $R_i$ of the loss when the claimant v is identified as the i-th enrolled user, can be expressed as follows, using the probability $a_{ji}$ that $v=u_j$ will be identified as $v=u_i$ and using the losses W (j, i) at this time.

$$R_i = \sum_{j=0, j \neq i}^{N} \pi_j W(j, i) \alpha_{ji} \tag{24}$$

Here, let the probability be denoted by $a_{ji}$ and let the losses be denoted by W (j, i). Then, using the following equation, the fact that EFRR and $R_n$ are equal to or less than the desired values EFRR' and $R_n'$, can be derived referring to the Vladimir P. Dragalin, et al.

$$\alpha_{ji} = \begin{cases} \frac{EFAR}{N-1}(j \neq i, j \neq 0, i \neq 0) \\ EFRR(j \neq i, i = 0) \\ \frac{EFAR}{N}(j \neq i, j = 0) \end{cases} \tag{25}$$

$$W(j, i) = \begin{cases} W_1(j \neq i, j \neq 0, i \neq 0) \\ 1(j \neq i, j = 0) \\ W_2(j \neq i, j = 0) \end{cases} \tag{26}$$

As described above, each time authentication is performed, the losses $W_1$ and $W_0$ are calculated, and the prior probabilities and the thresholds are set based on the calculated losses $W_1$ and $W_0$. Thus, it is possible to ensure that EFRR as well as the expected value $R_n$ of the loss when the claimant v is identified as the n-th enrolled user, are equal to or less than the desired values EFRR' and $R_n'$, respectively. As a result, the desired availability and security can be reliably achieved.

While the embodiments of the present invention have been described, it should be understood that the following variant can also be used.

Variant

In the above described embodiments, the threshold A used in the determination process is set to a value larger than 0.5. However, the threshold A may be set to 0.5 or less. In the case of the threshold A set to 0.5 or less, if plural posterior probabilities exceeding the threshold A exist, the determination unit 114 determines based on the posterior probability showing the maximum value of the posterior probabilities exceeding the threshold A.

Further, in the biometric authentication systems of the above described embodiments, the authentication client terminal 100 and the authentication server terminal 110 are coupled through the network 140. However, the configurations of the terminals 100 and 110 may be put together to constitute a single unit of the biometric authentication system. In such a case, the authentication request unit 104, which is provided in the authentication client terminal 100 in the above embodiments, can be omitted. The authentication client terminal 100 and the authentication server terminal 110 are not limited to the configurations shown in FIGS. 1 and 7. For example, the processing units 102, 111 to 115, and 118, which are realized by the CPU executing a program, may be provided either to the authentication client terminal 100 or to the authentication server terminal 110. In addition, all or some of the processing units may be put together as a single unit, or may be broken into separate components.

In the above described embodiments, the likelihood ratio calculation unit 118 calculates the likelihood ratio of each of the enrolled users $u_n$, using the matching scores obtained by 1:N matching unit 112 in step S307 of FIG. 3 (step S308). However, the likelihood ratio may be calculated for each of the enrolled users $u_n$, based on the biometric information enrolled templates 122 held in the enrolled user database 120, as well as on the claimant feature data extracted by the feature extracting unit 102 of the authentication client terminal 100. More specifically, each time the claimant feature data $x_J$ (J=1, 2, and so on) is obtained, the likelihood $l_n$ of each of the enrolled users $u_n$ is calculated by the following equation, using the distribution $p_n(x_J)$ of the feature of the individual enrolled users $u_n$ (n=1 to N) and using the distribution $p_0(x_J)$ of the feature of all the enrolled users.

$$l_n = \prod_{j=1}^{J} P_n(x_j)/P_0(x_j) \quad (27)$$

It is possible to calculate the posterior probability of each of the enrolled users $u_n$ and the posterior probability of the non-enrolled user $u_0$, by replacing the calculated likelihood ratios with the likelihood ratios used in the posterior probability calculation functions described in the above embodiments.

Figure 6:
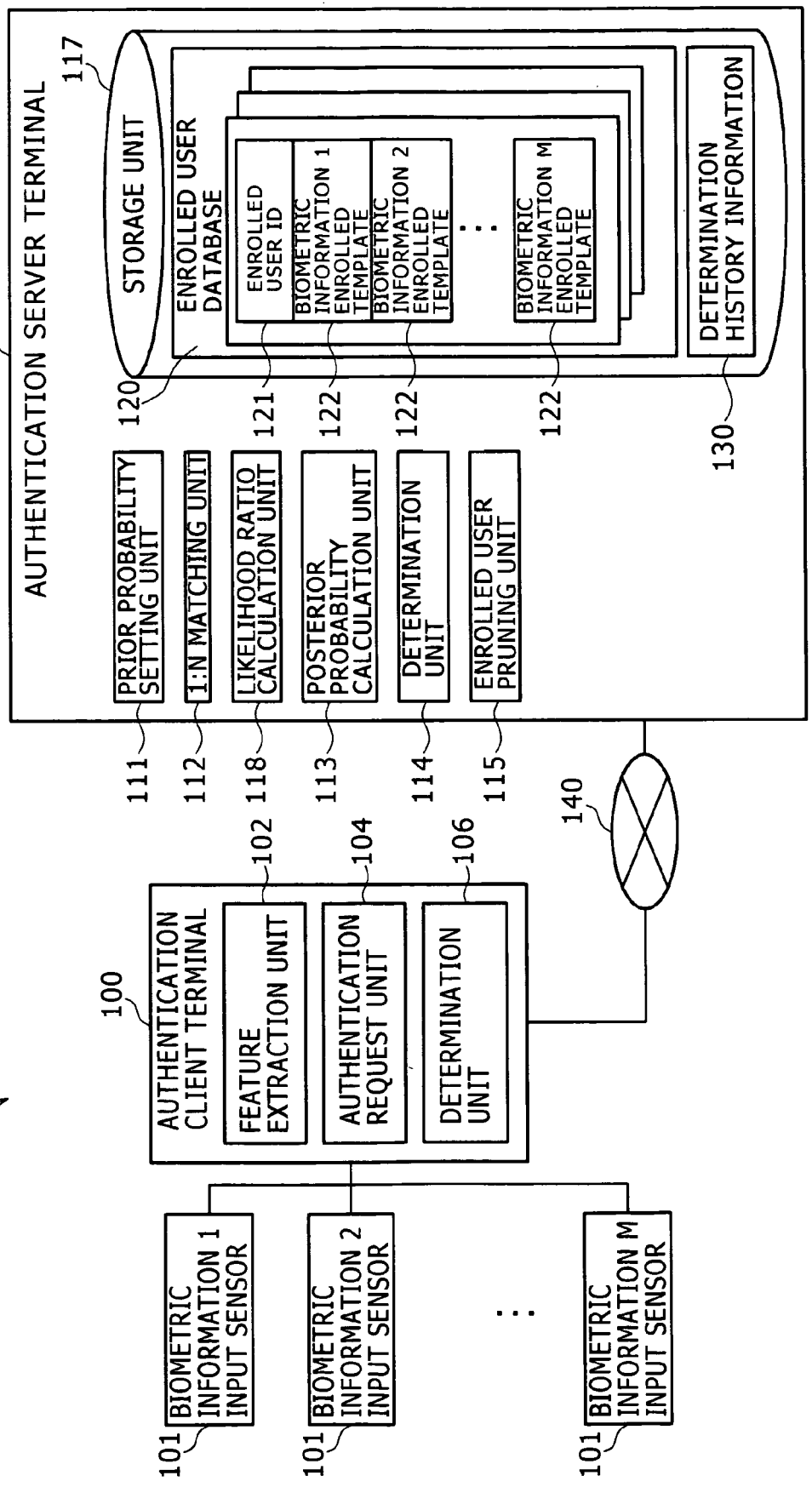
FIG. 6 is a diagram showing an example of the configuration of another biometric authentication system.

In the above described embodiments, the authentication server terminal 110 makes a determination of the claimant v. However, this determination may be made by the authentication client terminal 100. For example, as shown in FIG. 6, the authentication client terminal 100 is provided with a determination unit 106, while the authentication server terminal 110 is provided with a transmission information decision unit 116 in place of the determination unit 114 (FIG. 1). The other configurations of the authentication client terminal 100 and the authentication server terminal 110, and the configurations of the biometric information sensor 101 and the network 140, are basically the same as the respective configurations in the above embodiments, and are denoted by the same reference numerals. The authentication process procedure in the present configuration will be descried below.

First, the authentication request unit 104 of the authentication client terminal 100 transmits the claimant feature data extracted by the feature extraction unit 102, to the authentication server terminal 110. At the same time, the authentication request unit 104 calculates the ratio of the likelihood v=$u_n$ to the likelihood v≠$u_n$ with respect to each of the enrolled users $u_n$, based on the claimant feature data and the matching feature data held in the enrolled user database 120. Then, the authentication request unit 104 calculates the posterior probability of each of the enrolled users $u_n$ and the posterior probability of the non-enrolled user $u_0$, using the calculated likelihood ratios, and using the prior probabilities of both the enrolled users $u_n$ and the non-enrolled user $u_0$, which are set by the prior probability setting unit 111 of the authentication server terminal 110. Then the authentication request unit 104 compares each of the calculated posterior probabilities, with the threshold A. When the maximum value of the posterior probability is larger than the threshold A, the authentication request unit 104 requests the authentication server terminal 110 to transmit the information of the enrolled user $u_n$ or non-enrolled user $u_0$ corresponding to the posterior probability showing the maximum value.

In the authentication server terminal 110, in response to the request from the authentication client terminal 100, the prior probability setting unit 111, the 1:N matching unit 112, the likelihood ratio calculation unit 118, and the posterior probability calculation unit 113 perform the same processes as in the above embodiments, to calculate posterior probabilities. Then, the transmission information decision unit 116 compares each of the posterior probabilities calculated by the posterior probability calculation unit 113, with the threshold A. When the maximum value of the posterior probability is larger than the threshold A, the transmission information decision unit 116 decides the information of the enrolled user $u_n$ or non-enrolled user $u_0$ corresponding to the posterior probability showing the maximum value, and transmits the information to the authentication client terminal 100.

The authentication request unit 104 of the authentication client terminal 100 receives the information transmitted from the authentication server terminal 110, and asks the determination unit 106 to make a determination of the claimant v.

When the information received by the authentication request unit 104 is the information of the enrolled user $u_n$, the determination unit 106 of the authentication client terminal 100 determines that the enrolled user $u_n$ is identical to the claimant v. While when the information received by the authentication request unit 104 is the information of the non-enrolled user $u_0$, the determination unit 106 determines that the claimant v is a user other than the enrolled users $u_n$.

Then, the authentication request unit 104 preferably performs a process similar to the above embodiment (step S319 of FIG. 3), based on the determination result by the determination unit 106.

As another embodiment, the determination unit 114 of the authentication server 110 or the determination unit 106 of the authentication client terminal 100, may be configured to perform authentication by comparing the likelihood ratio (the ratio of the likelihood v=$u_n$ to the likelihood v≠$u_n$) calculated by the likelihood ratio calculation unit 118 with respect to each of the enrolled users $u_n$ in step S308 of FIG. 3, with a threshold C, instead of using the posterior probabilities. More specifically, when the maximum value of the likelihood ratio is larger than the threshold C, the determination unit 114 or 106 determines that the claimant v is identical to the enrolled user corresponding to the likelihood ratio showing the maximum value (authentication success). While when the maximum value of the likelihood ratio is equal to or less than the threshold C, and when the number of acquisitions of the biometric data from the claimant v is less than a predetermined value, the determination unit 114 or 106 requests to reacquire the biometric data of the claimant v. Further, when the number of acquisitions of the biometric data from the claimant v is equal to or more than the predetermined value, the determination unit 114 or 106 determines "authentication failure".

In the above case, the concept of prior and posterior probabilities is not used, so that steps S302 and S309 in the flowchart of FIG. 3 are not performed. Also, the concept of non-enrolled user $u_0$ is not used, so that step S313 is not performed either.

In the above case, for example, when the determination unit 114 or 106 requests to reacquire the biometric data, the enrolled user pruning unit 115 performs a pruning process by comparing each of the likelihood ratios calculated by the likelihood ratio calculation unit 118, with a threshold D, and excluding a enrolled user $u_n$ corresponding to the likelihood ratio smaller than the threshold D, from the target to be matched with the claimant v. The timing of the pruning may be between step S314 and step S315 in FIG. 3 (when the determination unit 114 or 106 requests to reacquire the biometric data), or may be after step S315.

In the foregoing description, the determination is made by calculating the likelihood ratio of each of the enrolled users $u_n$ based on the matching score of each of the enrolled users $u_n$, and by comparing each of the calculated likelihood ratios with the threshold C, in order to minimize the expected value of the number of inputs of the biometric data necessary for authentication. Further, in the conventional method for calculating likelihood ratios using the feature distribution, generally the dimensionality of the feature is large (for example, 2048 to 4096 dimensions for iris pattern). Very large numbers of study samples are necessary to estimate the feature distribution, and there is a problem of difficulty in practical application. On the other hand, when the likelihood ratio is calculated using the matching score whose dimensionality is typically one, it is possible to reliably estimate the first-person matching score distribution and the third-person matching score distribution.

According to the above described embodiments, the determination is made by calculating the ratio of the likelihood $v=u_n$ to the likelihood $v \neq u_n$ with respect to each of the enrolled users $u_n$, normalizing the likelihood ratios to the posterior probabilities of the enrolled users $u_n$ and to the posterior probability of the non-enrolled user $u_0$, and comparing each of the posterior probabilities with the threshold. This method significantly reduces (logically minimizes) the expected value of the number of inputs of the biometric data necessary for authentication.

Alternatively, the determination is made by calculating the matching score of each of the enrolled users $u_n$, calculating the likelihood ratio of each of the enrolled users $u_n$ by using the calculated matching scores, and comparing each of the likelihood ratios with the threshold. This method also significantly reduces (logically minimizes) the expected value of the number of inputs of the biometric data necessary for authentication.

Further, the prior probabilities of the enrolled users $u_n$ and the prior probability of the non-enrolled user $u_0$ are both set in advance, whereby not only the posterior probabilities of the enrolled users $u_n$ but also the posterior probability of the non-enrolled user $u_0$ is calculated. This method enables to clearly distinguish between the case in which the claimant v is identical to the non-enrolled user $u_0$ (forgery), and the case in which the claimant v is not identified (authentication failure). When the forgery user can be clearly recognized, it is possible to take measures (for example, such as presenting a warning information message, and stopping the operation of the sensor) to effectively prevent such a malicious user forgery.

The present invention can be applied to any biometric authentication system to verify identities based on biometric identification. For example, the present invention can be applied to a time and attendance management system, a personal authentication system for credit card payment, and an entrance/exit management system.

The specification and drawings are, accordingly, to be regarded in an illustrative rather than a restrictive sense. It will, however, be evident that various modifications and changes may be made thereto without departing from the spirit and scope of the invention as set forth in the claims.

What is claimed is:

1. A biometric authentication system comprising:
   a database holding enrolled feature data with respect to each of enrolled users $u_n$ (n=1 to N);
   each time biometric data is inputted from a claimant v, a feature extraction unit for extracting feature data of the claimant v based on the biometric data acquired from the claimant v;
   a prior probability setting unit for setting prior probabilities of the enrolled users $u_n$ and a prior probability of a non-enrolled user $u_0$;
   a 1:N matching unit for performing 1:N matching between the extracted claimant feature data of the claimant and the enrolled feature data held in the database and calculating a matching score of each of the enrolled users $u_n$;
   a likelihood ratio calculation unit for calculating a ratio of the likelihood $v=u_n$ to the likelihood $v \neq u_n$ with respect to each of the enrolled users $u_n$, by using the calculated matching scores according to input times of the biometric data;
   a posterior probability calculation unit for calculating posterior probabilities of the enrolled users $u_n$ and a posterior probability of the non-enrolled user $u_0$, using the calculated likelihood ratios, the prior probabilities of the enrolled users $u_n$, and the prior probability of the non-enrolled user $u_0$; and
   a determination unit for comparing each of the calculated posterior probabilities with a first threshold, when a maximum value of the posterior probability is larger than the first threshold, and when the posterior probability showing the maximum value is one of the posterior probabilities of the enrolled users $u_n$, determining that the corresponding enrolled user and the claimant v are identical, while when the posterior probability showing the maximum value is the posterior probability of the non-enrolled user $u_0$, determining that the claimant v is a non-enrolled user $u_0$, when the maximum value of the posterior probability is equal to or less than the first threshold, and when the number of acquisitions of the biometric data from the claimant v is less than a predetermined value, requesting to reacquire the biometric data of the claimant v, and while when the number of acquisitions is equal to or more than the predetermined value, determining "authentication failure".

2. The biometric authentication system according to claim 1, further comprising an enrolled user pruning unit,
   wherein, when the determination unit requests to reacquire the biometric data from the claimant v, the enrolled user pruning unit compares each of the posterior probabilities calculated by the posterior calculation unit with a second threshold, and excludes an enrolled user $u_n$ corresponding to the posterior probability smaller than the second threshold, from the target to be matched to the claimant v.

3. The biometric authentication system according to claim 1,
   wherein the posterior probability calculation unit compares the posterior probability of the non-enrolled user $u_0$ calculated in the current acquisition of the biometric data from the claimant v with the prior probability of the non-enrolled user $u_0$ when the number of acquisitions is one, or with the posterior probability of the non-enrolled user $u_0$ calculated in the previous acquisition of the biometric data when the number of acquisitions is two or more, and wherein, when the posterior probability of the non-enrolled user $u_0$ calculated in the current acquisition is higher, the posterior probability calculation unit does not use the feature data extracted in the current acquisition in the calculation of posterior probabilities in the subsequent acquisitions of the biometric data from the claimant v.

4. The biometric authentication system according to claim 1, wherein the database holds a plurality of different types of feature data belonging to a plurality of modalities with respect to each of the users $u_n$, and wherein the biometric authentication system further comprises a biometric information input sensor that allows for acquisition of the biometric data only once with respect to each of modalities.

5. The biometric authentication system according to claim 1, wherein the database holds a plurality of different types of feature data belonging to the same modality with respect to each of the enrolled users $u_n$, and wherein the 1:N matching unit determines "authentication failure" when the best matching score is obtained several times for the same biometric information until acquisition of the biometric data in this time.

6. The biometric authentication system according to claim 1, wherein the database holds a plurality of different types of feature data belonging to the same modality with respect to each of the enrolled users $u_n$, and wherein, when the best matching score is obtained several times for the same biometric information until acquisition of the biometric information in this time, the 1:N matching unit does not use among the matching score above the matching scores calculated in acquisitions other than the acquisition with the best matching score for the calculation of likelihood ratios by the likelihood ratio calculation unit.

7. The biometric authentication system according to claim 1, wherein, when the determination unit determines that the claimant v is a non-enrolled users $u_0$, the prior probability setting unit increases the prior probabilities of the non-enrolled users $u_0$.

8. The biometric authentication system according to claim 1, wherein the first threshold is larger than 0.5.

9. The biometric authentication system according to claim 1, wherein the determination unit outputs forgery warning information about the forgery when it is determined that the claimant v is the non-enrolled users $u_0$.

10. The biometric authentication system according to claim 1, further comprising:

a loss calculation unit; and a prior probability and threshold setting unit, wherein, each time authentication is performed, the loss calculation unit calculates a loss $W_1$ when the claimant v is an enrolled user and is identified as another enrolled user, and a loss $W_0$ when the claimant v is a non-enrolled user and is identified as a certain enrolled user, and wherein the prior probability and threshold setting unit sets the prior probabilities of the enrolled users $u_n$ and a corresponding threshold, as well as the prior probability of the non-enrolled user $u_0$ and a corresponding threshold, using the losses $W_1$ and $W_0$, respectively, so that EFRR as well as an expected value $R_n$ of the loss when the claimant v is identified as the n-th enrolled user are equal to or less than respective desired values.

11. A biometric authentication system comprising:

a database holding enrolled feature data with respect to each of enrolled users $u_n$ (n=1 to N);

each time biometric data is inputted from a claimant v, a feature extraction unit for extracting feature data of the claimant v based on biometric data acquired from the claimant v;

a 1:N matching unit for performing 1:N matching between the extracted feature data of the claimant and the enrolled feature data held in the database, and calculating a matching score of each of the enrolled users $u_n$;

a likelihood ratio calculation unit for calculating a ratio of the likelihood $v=u_n$ to the likelihood $v \neq u_n$ with respect to each of the enrolled users $u_n$, by using the calculated matching scores according to input times of the biometric data; and a determination unit for comparing each of the likelihood ratios with a first threshold, when a maximum value of the likelihood ratio is larger than the first threshold, determining that the enrolled user corresponding to the likelihood ratio showing the maximum value is identical to the claimant v, while when the maximum value of the likelihood ratio is equal to or less than the first threshold, and when the number of acquisitions of the biometric data from the claimant v is less than a predetermined value, requesting to reacquire the biometric data of the claimant v, and when the number of acquisitions is equal to or more than the predetermined value, determining "authentication failure".

12. The biometric authentication system according to claim 11, further comprising an enrolled user pruning unit, wherein, when the determination unit requests to reacquire the biometric data, the enrolled user pruning unit compares each of the likelihood ratios calculated by the likelihood ratio unit with a second threshold, and excludes an enrolled user $u_n$ corresponding to the likelihood ratio smaller than the second threshold, from the target to be matched to the claimant v.

13. An authentication client terminal capable of communicating with an authentication server terminal, the authentication server terminal including a database holding enrolled feature data with respect to each of enrolled users $u_n$ (n=1 to N), and a prior probability setting unit for setting prior probabilities of the enrolled users $u_n$ and a prior probability of a non-enrolled user $u_0$, the authentication client terminal comprising:

a feature extraction unit for extracting the feature data of a claimant v based on the biometric data acquired from the claimant v;

an authentication request unit for transmitting the extracted feature data of the claimant to the authentication server terminal, calculating a ratio of likelihood $v=u_n$ to likelihood $v \neq u_n$ with respect to each of the enrolled users $u_n$, based on the feature data of the claimant and the matching feature data held in the database, calculating the posterior probabilities of the enrolled users $u_n$ and the posterior probability of the non-enrolled user $u_0$, using the calculated likelihood ratios, the prior probabilities of the enrolled users $u_n$, and the prior probability of the non-enrolled user $u_0$, comparing each of the calculated posterior probabilities with a first threshold, when a maximum value of the posterior probability is larger than the first threshold, the authentication request unit requesting to transmit the information of the enrolled user $u_n$ or non-enrolled user $u_0$ corresponding to the posterior probability showing the maximum value, and acquiring the information transmitted from the authentication server terminal in response to the request; and a determination unit for determining that when the acquired information is of the enrolled users $u_n$, the enrolled user $u_n$ and the claimant v are identical, and that when the acquired information is of the non-enrolled user $u_0$, the claimant v is a user other than the enrolled users $u_n$.

14. The authentication client terminal according to claim 13,

Wherein the authentication request unit requests to perform 1:N matching between the extracted feature data of the claimant and the feature data held in the database, calculates the matching score of each of the enrolled users $u_n$, and calculates the likelihood ratio of each of the enrolled users $u_n$ by using the calculated matching scores.

15. A biometric authentication method using a database holding enrolled feature data with respect to each of enrolled users $u_n$ (n=1 to N) and prior probabilities of the enrolled users $u_n$ and a prior probability of a non-enrolled user $u_0$, comprising:

each time biometric data is inputted from a claimant v, extracting feature data of the claimant v based on the biometric data acquired from the claimant v;

performing 1:N matching between the extracted claimant feature data of the claimant and the enrolled feature data held in the database, and calculating a matching score of each of the enrolled user $u_n$;

calculating a ratio of likelihood $v=u_n$ to likelihood $v \neq u_n$ with respect to each of the enrolled users $u_n$, by using the calculated matching scores according to input times of the biometric data;

calculating posterior probabilities of the enrolled users $u_n$ and a posterior probability of the non-enrolled user $u_0$, using the calculated likelihood ratios, the prior probabilities of the enrolled users $u_n$, and the prior probability of the non-enrolled user $u_0$; and comparing each of the calculated posterior probabilities with a first threshold, when a maximum value of the posterior probability is larger than the first threshold, and when the posterior probability showing the maximum value is one of the posterior probabilities of the enrolled users $u_n$, determining that the corresponding enrolled user and the claimant v are identical, while when the posterior probability showing the maximum value is the posterior probability of the non-enrolled user $u_0$, determining that the claimant v is a non-enrolled users $u_0$, when the maximum value of the posterior probability is equal to or less than the first threshold, and when the number of acquisitions of the biometric data from the claimant v is less than a predetermined value, requesting to reacquire the biometric data of the claimant v, and while when the number of acquisitions is equal to or more than the predetermined value, determining "authentication failure".

16. An authentication client terminal capable of communicating with an authentication server terminal, the authentication server terminal including a database holding enrolled feature data with respect to each of enrolled users $u_n$ (n=1 to N), and a prior probability setting unit for setting prior probabilities of the enrolled users $u_n$ and a prior probability of a non-enrolled user $u_0$, the authentication client terminal comprising:

each time biometric data is inputted from a claimant v, a feature extraction unit for extracting the feature data of the claimant v based on the biometric data acquired from the claimant v;

an authentication request unit for transmitting the extracted feature data of the claimant to the authentication server terminal, requesting to perform 1:N matching between the extracted claimant feature data of the claimant and the enrolled feature data held in the database, to calculate a matching score of each of the enrolled users $u_n$, to calculate a ratio of likelihood $v=u_n$ to likelihood $v \neq u_n$ with respect to each of the enrolled users $u_n$, by using the calculated matching scores according to input times of the biometric data, to calculate posterior probabilities of the enrolled users $u_n$ and the posterior probability of the non-enrolled user $u_0$, using the calculated likelihood ratios, the prior probabilities of the enrolled users $u_n$, and the prior probability, of the non-enrolled user $u_0$, to compare each of the calculated posterior probabilities with a first threshold, and when a maximum value of the posterior probability is larger than the first threshold, to transmit the information of the enrolled user $u_n$ or non-enrolled user $u_0$ corresponding to the posterior probability showing the maximum value, and acquiring the information transmitted from the authentication server terminal in response to the request; and a determination unit for determining that when the acquired information is of the enrolled users $u_n$, the enrolled user $u_n$ and the claimant v are identical, and that when the acquired information is of the non-enrolled user $u_0$, the claimant v is a user other than the enrolled users $u_n$.

* * * * *